United States Patent
Chen

(10) Patent No.: US 9,948,950 B2
(45) Date of Patent: Apr. 17, 2018

(54) DISPARITY VECTOR AND/OR ADVANCED RESIDUAL PREDICTION FOR VIDEO CODING

(71) Applicant: QUALCOMM Incorporated, San Diego, CA (US)

(72) Inventor: Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/588,837

(22) Filed: Jan. 2, 2015

(65) Prior Publication Data

US 2015/0195572 A1    Jul. 9, 2015

Related U.S. Application Data

(60) Provisional application No. 61/923,613, filed on Jan. 3, 2014.

(51) Int. Cl.
| | |
|---|---|
| *H04B 1/66* | (2006.01) |
| *H04N 19/597* | (2014.01) |
| *H04N 19/517* | (2014.01) |
| *H04N 19/70* | (2014.01) |

(52) U.S. Cl.
CPC ......... *H04N 19/597* (2014.11); *H04N 19/517* (2014.11); *H04N 19/70* (2014.11)

(58) Field of Classification Search
CPC .. H04N 19/597; H04N 13/0048; H04N 19/70; H04N 19/517
USPC .......................... 348/43; 375/240.15, E07.243
See application file for complete search history.

(56) References Cited

U.S. PATENT DOCUMENTS

| | | | | |
|---|---|---|---|---|
| 2012/0121017 A1* | 5/2012 | Chen | ................... | H04N 19/159 375/240.15 |
| 2013/0287123 A1* | 10/2013 | Rusert | ............... | G06F 17/30516 375/240.26 |
| 2014/0168362 A1* | 6/2014 | Hannuksela | ....... | H04N 13/0048 348/43 |

OTHER PUBLICATIONS

International Preliminary Report on Patentability from International Application No. PCT/US2015/010073, dated Apr. 8, 2016, 20 pp.
Wiegand et al., "WD1: Working Draft 1 of High-Efficiency Video Coding", JCTVC-C403, 3rd Meeting: Guangzhou, CN, Oct. 17-15, 2010, (Joint Collaborative Team on Video Coding of ISO/IEC JTC1/SC29/VG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29N/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

(Continued)

*Primary Examiner* — Sathyanaraya V Perungavoor
*Assistant Examiner* — Peet Dhillon
(74) *Attorney, Agent, or Firm* — Shumaker & Sieffert, P.A.

(57) ABSTRACT

A device for processing three-dimensional (3D) video data may determine, based on direct dependent layers signaled in a video parameter set, that the current texture layer of the video data is dependent on a depth layer of the video data; and process the current texture layer using the depth layer.

23 Claims, 16 Drawing Sheets

(56) References Cited

OTHER PUBLICATIONS

Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29N/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29N/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29N/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen, et al., "AHG5: Comments on Default NBDV View Selection and ARP Target Reference Picture", JCT-3V Meeting, Jan. 11-17, 2014, San Jose, (The Joint Collaborative Team on 3D Video Coding Extension Development of ISO/IEC JTC1/SC29/WG11 and ITU-TSG.16), URL: http://phenix.int-evry.fr/jct2/, No. JCT3V-G0129, Jan. 3, 2014, XP030131907, 4 pp.

Deshpande "Comments on SHVC and MV-HEVC", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0195, Jul. 16, 2013, XP030114688, 7 pp.

Hendry et al., "MV-HEVC/SHVC HLS: On Inter-layer Prediction Signaling", JCT-VC Meeting, Oct. 23-Nov. 1, 2013, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-O0254-r1, Version 3, Oct. 24, 2013, XP030115316, 7 pp.

Zhang, et al., "Test Model 6 of 3D-HEVC and MV-HEVC", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16); URL: http://phenix.int-evry_fr/jct2/, No. JCT3V-F1005, Dec. 16, 2013, XP030131735, 52 pp.

Tech, et al., "3D-HEVC Draft Text 2," Joint Collaboration Team on 3D Video Coding Extension Development of ITU-T SG 16 WP 3 and ISO/IEC JTC 1/SC 29/WG 11, Oct. 25-Nov. 1, 2013; Document: JCT3V-F1001-v4, 6th Meeting; Geneva, CH, Dec. 14, 2013, 94 pp.

Tian, et al.,"CE1.h: Backward View Synthesis Prediction using Neighbouring Blocks ", JCT-3V Meeting; MPEG Meeting; Jan. 16-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0152, Jan. 10, 2013, XP030130568, 5 pp.

Zhang, et al., "CE2: Derived disparity vector for 3D-HEVC," JCT-3V Meeting; MPEG Meeting; (The Joint Collaborative Team on 3D Video Coding Extension Development of ISO/IEC JTC1/SC29/WG11 and ITU-T SG.16 ); Oct. 25-Nov. 1, 2013; Document: JCT3V-F0124, Oct. 25, 2013, 4 pp.

International Search and Written Opinion from International Application No. PCT/US2015/010073, dated Mar. 17, 2015, 12 pp.

Response to Written Opinion dated Mar. 17, 2015, from International Application No. PCT/US2015/010073, filed on Oct. 29, 2015, 14 pp.

Second Written Opinion from International Application No. PCT/US2015/010073, dated Dec. 9, 2015, 5 pp.

Response to Second Written Opinion dated Dec. 9, 2015, from International Application No. PCT/US2015/010073, filed on Feb. 9, 2016, 16 pp.

Tech, et al., "3D-HEVC Draft Text 2," Joint Collaboration Team on 3D Video Coding Extension Development of ITU-T SG 16 WP 3 and ISO/IEC JTC 1/SC 29/WG 11, Oct. 25-Nov. 1, 2013; Document: JCT3V-F1001-v2, 6th Meeting; Geneva, CH, Dec. 5, 2013, 93 pp.

* cited by examiner

INTRA PREDICTION MODES IN HEVC

TEMPORAL NEIGHBORING BLOCKS IN NBDV

| combIdx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

FIG. 7

**DERIVATION OF MVI
CANDIDATE FOR DEPTH CODING**

DISPARITY VECTOR AND/OR ADVANCED RESIDUAL PREDICTION FOR VIDEO CODING

This application claims the benefit of U.S. Provisional Application Ser. No. 61/923,613, filed 3 Jan. 2014, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In one example, a method of processing three-dimensional (3D) video data includes determining, based on direct dependent layers signaled in a video parameter set (VPS), that the current texture layer of the video data is dependent on a depth layer of the video data; and, processing the current texture layer using the depth layer.

In another example, a method of encoding 3D video data includes, in response to a current texture layer of the video data being dependent on a depth layer of the video data, signaling direct dependent layers in a video parameter set; and processing the current texture layer using the depth layer.

In another example, a video coding device includes a memory configured to store video data and one or more processors configured to determine, based on direct dependent layers signaled in a video parameter set, that the current texture layer of the video data is dependent on a depth layer of the video data and process the current texture layer using the depth layer.

In another example, a computer readable storage medium storing instructions that when executed by one or more processors cause the one or more processors to determine, based on direct dependent layers signaled in a video parameter set, that the current texture layer of the video data is dependent on a depth layer of the video data and process the current texture layer using the depth layer.

In another example, an apparatus for processing 3D video data includes means for determining, based on direct dependent layers signaled in a video parameter set, that the current texture layer of the video data is dependent on a depth layer of the video data; and means for processing the current texture layer using the depth layer.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a table showing the specification of 10CandIdx and 11CandIdx in three-dimensional HEVC (3D-HEVC).

DETAILED DESCRIPTION

Figure 1:
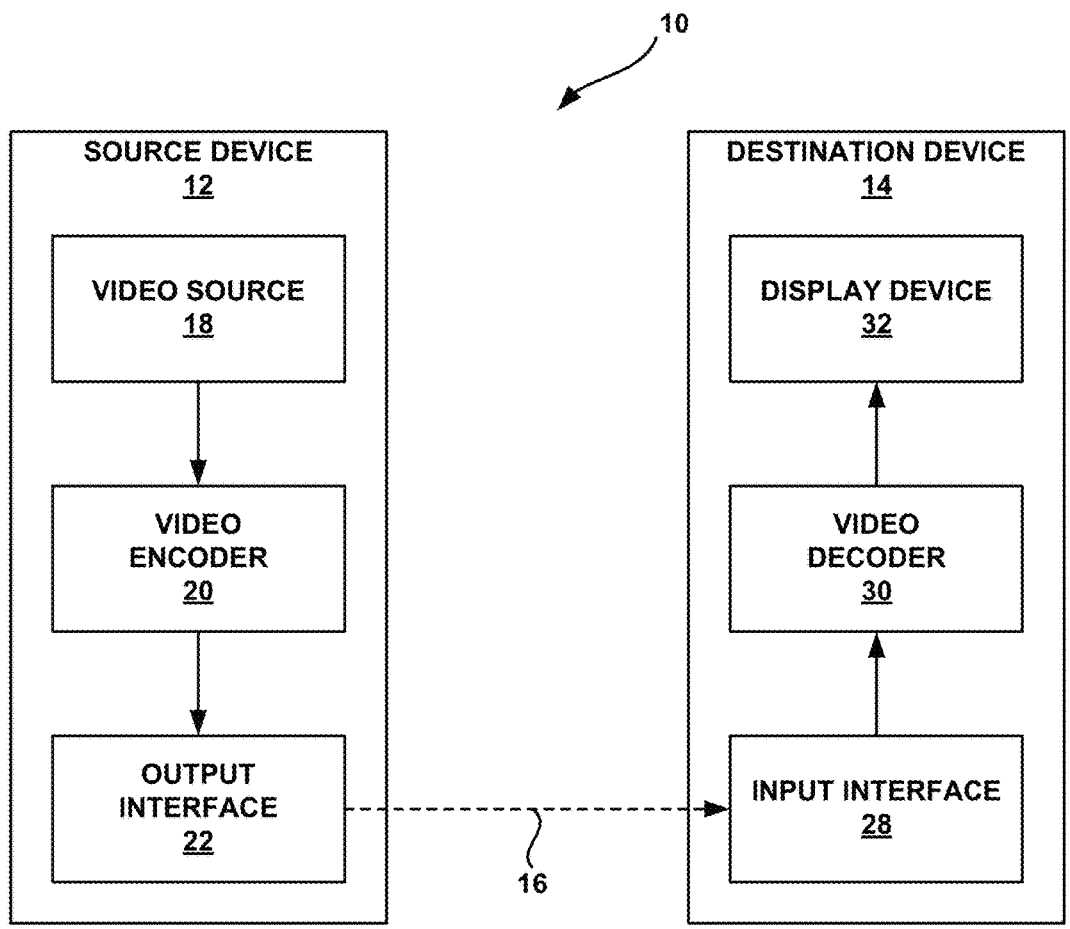
FIG. 1 is a block diagram illustrating an example video encoding and decoding system that may utilize the techniques described in this disclosure.

This disclosure describes techniques related to video coding and, more particularly, techniques related to three-dimensional (3D) video coding and other types of multi-layer and/or multi-view coding. Various coding tools used for coding multi-layer video utilize information obtained from one layer to code one or more video blocks in a current layer. For example, a motion vector for coding a current block of a current layer may be determined by identifying a motion vector used to code another block of another layer. As the coding of the current layer is dependent on another layer, the current layer is considered to be directly dependent on the other layer. In order for video decoders and other video processing devices to properly handle multi-layer video, the video processing device may need to know upon which other layers a certain layer depends.

In 3D video coding, video data is typically coded as one or more texture views and one or more corresponding depth views. Based on a coded texture view and a coded depth view, a video rendering device may synthesize additional views. As will be explained in more detail below, various coding tools such as depth-oriented, neighboring block disparity (DoNBDV) processes or a backward-warping view synthesis prediction (BVSP) process may code a texture layer utilizing information obtained from a depth layer, thus making the texture layer directly dependent on the depth layer.

According to the techniques of this disclosure, a video encoder may signal, in a video parameter set (VPS) for example, the direct dependencies of layers with different properties of depth and texture. In other words, a video encoder may signal in the video bitstream that a texture layer is dependent on a particular depth layer or that a depth layer is dependent on a particular texture layer.

Various techniques in this disclosure will be described with reference to a video coder, which is intended to be a generic term that can refer to either a video encoder or a video decoder. Unless explicitly stated otherwise, it should not be assumed that techniques described with respect to a video encoder or a video decoder may not be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure may be performed by either of a video encoder or a video decoder.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices.

FIG. 1 is a block diagram illustrating an example video encoding and decoding system 10 that may utilize the techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded video data may be output from output interface 22 to a storage device. Similarly, encoded video data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multiview coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for temporal motion vector prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard and may conform to the HEVC Test Model (HM). Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Other video coding standards, according to which video encoder 20 and video decoder 30 may be configured to operate, include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A draft of MVC is described in "Advanced video coding for generic audiovisual services," ITU-T Recommendation H.264, March 2010.

The JCT-VC has recently finalized the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU may also be referred to as leaf-CUs even if there is no explicit splitting of the original leaf-CU. For example, if a CU at 16×16 size is not split further, the four 8×8 sub-CUs may also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

A number of aspects of HEVC are outlined below to facilitate understanding of the basis of the neighboring block-based disparity vector (NBDV) and advanced residual prediction (ARP) techniques described in this disclosure. Various aspects of base HEVC are described below such as intra prediction, reference list construction, and temporal motion vector prediction. Additionally, various aspects of a three dimensional video extension of HEVC that build from intra prediction, reference list construction, and temporal motion vector prediction are also described below. It should be understood that, while certain aspects of this disclosure may be described with respect to HEVC for purposes of explanation, the techniques are not limited in this way and may be used with a variety of other coding standards.

Figure 2:
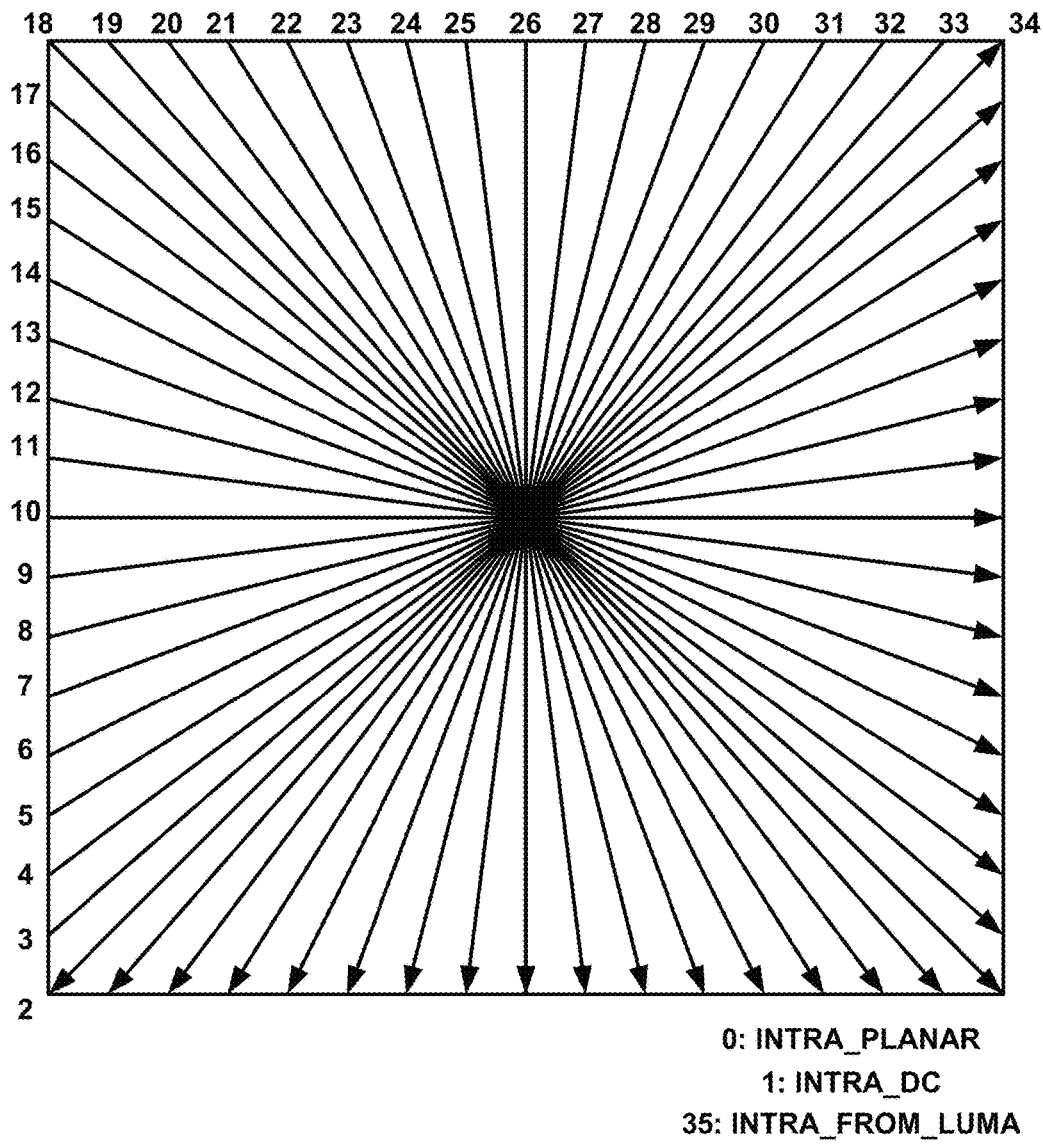
FIG. 2 is a diagram illustrating intra-prediction modes set forth in the high efficiency video coding (HEVC) standard.

FIG. 2 is a diagram showing the intra prediction modes supported by HEVC. When performing intra-prediction according to HEVC, for the luma component of each PU, video encoder 20 and/or video decoder 30 may utilize 33 angular prediction modes (indexed from 2 to 34), a DC mode (indexed with 1) and a Planar mode (indexed with 0), as shown in FIG. 2. When performing intra prediction, video decoder 30 predicts a current block based on pixel values obtained from a neighboring block according to the angle of the intra prediction mode, when angular intra-prediction is used. For blocks coded using DC intra prediction mode, video decoder 30 determines a predictive block by averaging the values of neighboring reference samples to determine a mean value, and for blocks coded using planar mode, video decoder 30 determines a predictive block by performing a two-dimensional linear interpolation of neighboring pixels values.

For performing inter prediction, video encoder 20 and video decoder 30 may construct reference picture lists that include the reference pictures from which video encoder 20 and video decoder 30 may inter predict a block. Regarding reference picture list construction in HEVC, video encoder 20 and video decoder 30 may typically construct a reference picture list for the first or the second reference picture list of a B picture using two steps. First, video encoder 20 and video decoder 30 may perform reference picture list initialization, and secondly, video encoder 20 and video decoder 30 may perform reference picture list reordering (e.g. modification of the ordering). The reference picture list initialization may be an explicit mechanism that puts the reference pictures in the reference picture memory (also known as decoded picture buffer) into a list based on the order of POC (Picture Order Count, aligned with display order of a picture) values. The reference picture list reordering mechanism may modify the position of a picture that was put in the list during the reference picture list initialization to any new position or put any reference picture in the reference picture memory in any position even the picture does not belong to the initialized list. Some pictures, after the reference picture list reordering, may be put in a lower position in the list. In instances, when the position of a picture exceeds the number of active reference pictures of the list, the picture may not be considered as an entry of the final reference picture list. In other words, if a reference list includes X active reference pictures with list positions ranging from to 0 to X−1, then video encoder 20 and video decoder 30 may exclude as candidate reference pictures for performing inter prediction and reference pictures at positions X and higher in the reference picture list. The number of active reference pictures may, for example, be signaled in the slice header for each list.

After video encoder 20 and video decoder 30 construct reference picture lists (namely RefPicList0 and RefPicList1 if available), a reference index to a reference picture list may be used to identify any reference picture included in the reference picture list. In other words, video encoder 20 may select one or more reference pictures to use for performing inter prediction, and signal to video decoder 30 in the encoded video bitstream the selected reference pictures.

In addition to signaling the selected reference picture, video encoder 20 may also signal in the encoded bitstream a motion vector for video decoder 30 to use in locating a reference block in the selected reference picture. Video encoder 20 may predictively signal the motion vector. Two examples of predictive signaling techniques include advanced motion vector prediction (AMVP) and merge mode signaling. In AMVP, video encoder 20 and video decoder 30 both assemble candidate lists based on motion vectors determined from already coded blocks. Video encoder 20 then signals an index into the candidate list to identify a motion vector predictor (MVP) and signals a motion vector difference (MVD). In AMVP, the motion vector that video decoder 30 uses to inter predict a block is the MVP as modified by the MVD, e.g. MVP+MVD.

In merge mode, video encoder 20 and video decoder 30 both assemble a candidate list based on already coded blocks, and video encoder 20 signals an index for one of the candidates in the candidate list. In merge mode, video decoder 30 inter predicts the current block using the motion vector and the reference picture index of the signaled candidate. In both AMVP and merge mode, video encoder 20 and video decoder 30 utilize the same list construction techniques, such that the list used by video encoder 20 when determining how to encode a block matches the list used by video decoder 30 when determining how to decode the block.

For performing AMVP and merge, video encoder 20 and video decoder 30 may determine a temporal motion vector predictor (TMVP) candidate. With regard to motion vector prediction and more specifically temporal motion vector prediction, to identify a TMVP candidate, firstly video encoder 20 and/or video decoder 30 may identify a co-located picture. If the current picture is a B slice, video encoder 20 may signal a collocated_from_l0_flag in slice header to indicate whether the co-located picture is from RefPicList0 or RefPicList1 . After a reference picture list is identified, the video coder uses collocated_ref_idx, signaled in a slice header to identify the picture in the picture in the list.

The video coder may then identify a co-located prediction unit (PU) by possibly checking the co-located picture. Either the motion information of the right-bottom PU of the coding unit (CU) containing this PU, or the motion of the right-bottom PU within the center PUs of the CU containing this PU may be used.

When motion vectors identified by the above process are used to generate a motion candidate for AMVP or merge mode, they may be scaled based on the temporal location (reflected by a picture order count (POC) value).

In some instances, the target reference index of all possible reference picture lists for the temporal merging candidate derived from TMVP is always set to 0 while for AMVP, it is set equal to the decoded reference index.

In HEVC, the sequence parameter set (SPS) includes a flag sps_temporal_mvp_enable_flag, and the slice header includes a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order may be used as a temporal motion vector predictor in decoding of the particular picture or a picture after the particular picture in decoding order.

A Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, the JCT aims to guarantee that there are only high-level syntax (HLS) changes to HEVC, such that no module in the CU/PU level in HEVC needs to be re-designed and, thus, may be fully reused for MV-HEVC. For 3D-HEVC, however, new coding tools, including coding tools used at the CU/PU level for both texture and depth views, may be included and supported. The latest software 3D-HTM for 3D-HEVC can be downloaded from the following link: [3D-HTM version 7.0]: https://hevc.hhi.fraunhofer.de/svn/svn_3DVCSoftware/tags/HTM-7.0/

The latest reference software description as well as the working draft of 3D-HEVC is to be available as follows: Gerhard Tech, Krzysztof Wegner, Ying Chen, Sehoon Yea, "3D-HEVC Test Model 4," JCT3V-F1001, Joint Collaborative Team on 3D Video Coding Extension Development of ITU-T SG 16 WP 3 and ISO/IEC JTC 1/SC 29/WG 11, 6th Meeting, which may be downloaded from the following link: http://phenix.int-evry.fr/jct2/doc_end_user/documents/6_Geneva/wg11/JCT3V-F1001-v2.zip.

As one example of a new tool supported by 3D-HEVC, a video coder implementing 3D-HEVC determine and utilize an implicit disparity vector (IDV). The video coder may, for example, generate an IDV when a PU employs inter-view motion vector prediction, e.g., a candidate for AMVP or merge modes is derived from a corresponding block in the other view with the help of a disparity vector. Such a disparity vector may be referred to as IDV. An IDV may be stored for the PU for the purpose of disparity vector derivation.

3D-HEVC also provides for a disparity vector derivation process. To derive a disparity vector, the video coder may use a process referred to as NBDV in the current 3D-HTM (which refers to the test software to be implemented by a video encoder, such as video encoder 20). According to NBDV, video encoder 20 and video decoder 30 may utilize DMVs determined from spatial and temporal neighboring blocks. In NBDV, video encoder 20 and video decoder 30 check the motion vectors of spatial and/or temporal neighboring blocks in a fixed order. Once a disparity motion vector or an IDV is identified, video encoder 20 and video decoder 30 terminate the checking process. Video encoder 20 and video decoder 30 may convert the identified disparity motion vector to a disparity vector which may be used in inter-view motion prediction and/or inter-view residue prediction. If no such disparity vector is found after checking all the pre-defined neighboring blocks, video encoder 20 and video decoder 30 may use a zero disparity vector for inter-view motion prediction while inter-view residual prediction may be disabled for the corresponding PU.

Figure 3:
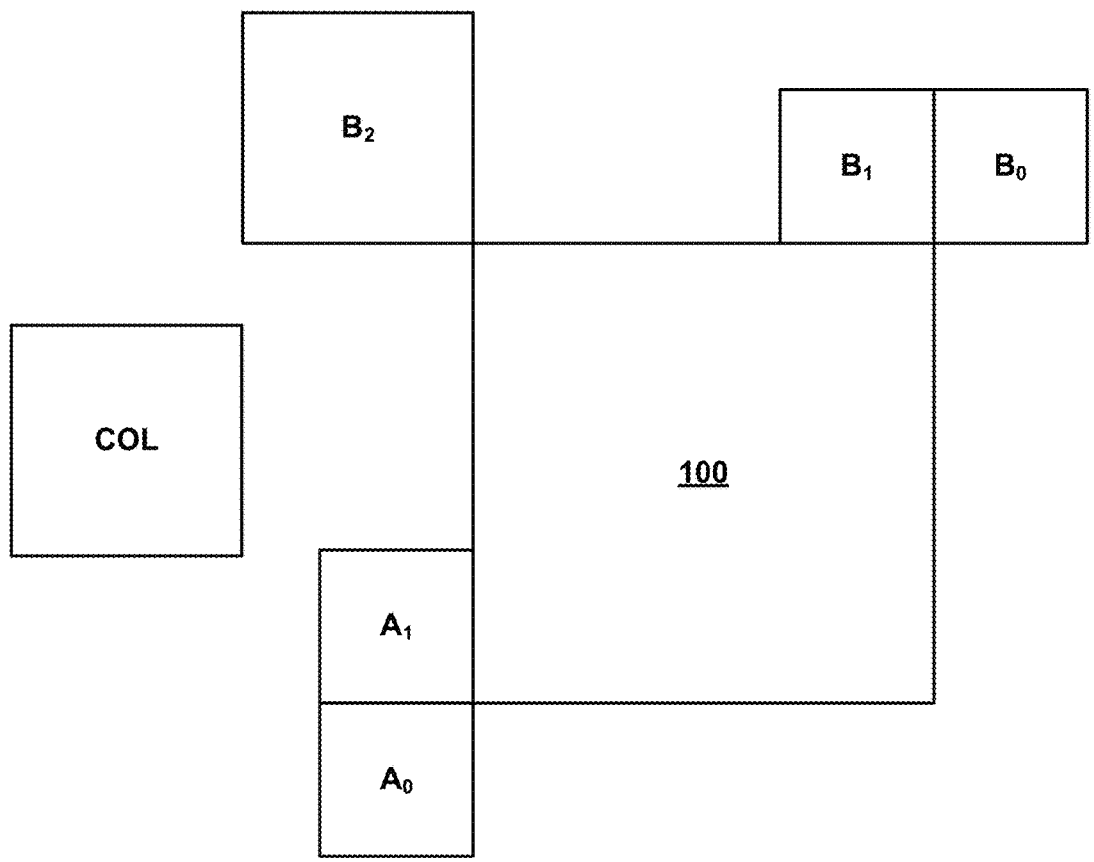
FIG. 3 is a block diagram illustrating spatial and temporal neighboring blocks used for Neighboring Blocks based Disparity Vector (NBDV).

FIG. 3 shows a representation of the spatial and temporal neighboring blocks that may be used by video encoder 20 and video decoder 30 for NBDV. Video encoder 20 and video decoder 30 may use five spatial neighboring blocks for the disparity vector derivation. The five spatial neighboring blocks are: the below-left, left, above-right, above and above-left blocks of current prediction unit (PU), denoted respectively by A0, A1, B0, B1 or B2, as shown in FIG. 3.

Figure 4:
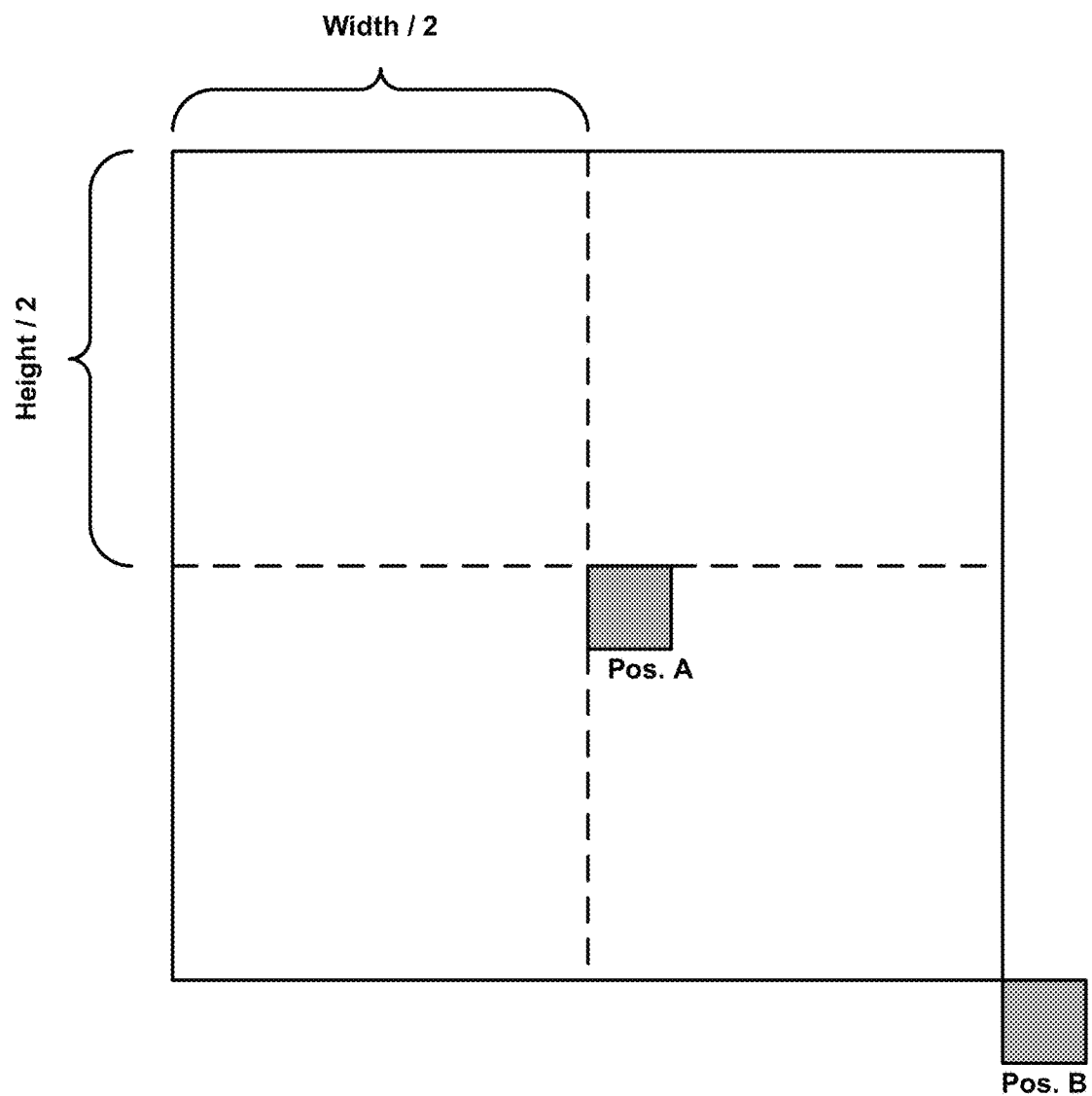
FIG. 4 is a block diagram illustrating example locations for motion vector predictor candidates.

Video encoder 20 and video decoder 30 may, for example, consider up to two reference pictures from current view for determining temporal neighboring blocks. The two reference pictures may, for example, be the co-located picture and the random-access picture or the reference picture with the smallest POC difference and smallest temporal ID may be considered for temporal block checks. In some examples, video encoder 20 and video decoder 30 may first check the random-access picture, followed by the co-located picture. For each candidate picture, video encoder 20 and video decoder 30 may check two candidate blocks. The two candidate blocks may, for example, be a center block (e.g. the center 4×4 block of the co-located region of the current PU, see 'Pos. A' in FIG. 4) and a bottom right block (e.g. the bottom-right 4×4 block of co-located region of the current PU, see 'Pos. B' in FIG. 4).

With regard to the so-called "checking order," whether DMVs are used is, in some examples, firstly checked for all the spatial/temporal neighboring blocks, followed by IDVs. In these examples, spatial neighboring blocks are firstly checked, followed by temporal neighboring blocks.

Typically, video encoder 20 and video decoder 30 check the five spatial neighboring blocks of FIG. 3 in the order of A1, B1, B0, A0 and B2. If one of them was predicting using a DMV, then video encoder 20 and video decoder 30 terminate the checking process and use the corresponding DMV as the final disparity vector.

Also, in these and other examples, for each candidate picture, the two blocks are checked in order, CR and BR for the first non-base view or BR, CR for the second non-base view. If one of them was predicted using a DMV, then video encoder 20 and video decoder 30 terminate the checking process and use the corresponding DMV as the final disparity vector.

Video encoder 20 and video decoder 30 may also check the five spatial neighboring blocks of FIG. 3 in the order of A0, A1, B0, B1 and B2. If one of the five spatial neighboring blocks was predicted using an IDV and was coded using skip/merge mode, then video encoder 20 and video decoder 30 may terminate the checking process and use the corresponding IDV as the final disparity vector in these and other examples.

With regard to the derivation of the default reference index for NBDV, in 3D-HEVC, the NBDV process may return a default disparity vector (zero), associated with a default view order index when the checked neighboring blocks do not contain a DMV. In this way, the current NBDV process may need to check both reference picture lists and compare the view order index one by one to derive a default view order index.

3D-HEVC also provides for refining of the disparity vector. That is, the disparity vector, generated from the NBDV scheme may be further refined using the information in the coded depth map. In other words, the accuracy of the disparity vector may be enhanced by taking benefit of the information coded base view depth map. The refinement steps are described by way of one example as follows:
1) Locate a corresponding depth block by the derived disparity vector in the previously coded reference depth view, such as the base view; the size of the corresponding depth block is the same as that of current PU.
2) A disparity vector is calculated from the collocated depth block, from the maximum value of the four corner depth values. This is set equal to the horizontal component of a disparity vector, while the vertical component of the disparity vector is set to 0.

This new disparity vector may be referred to as a "depth oriented neighboring block based disparity vector (DoNBDV)." The disparity vector from NBDV scheme may then be replaced by this newly derived disparity vector from the DoNBDV scheme for inter-view candidate derivation for the AMVP and merge modes. Note that the unrefined disparity vector may be used for inter-view residual prediction. In addition, the refined disparity vector is stored as the motion vector of one PU if it is coded with backward VSP (BVSP) mode.

3D-HEVC also provides for block-based view synthesis prediction using neighboring blocks. The backward-warping VSP (which is the same or similar to BVSP and is also denoted as BVSP) approach as proposed in JCT3V-C0152 by authors Tian et al. and entitled "CE1.h: Backward View Synthesis Prediction using Neighbouring Blocks" was adopted in the 3rd JCT-3V meeting. The basic idea of this backward-warping VSP is the same as or similar to the block-based VSP in 3D-AVC. Both of these two processes may use the backward-warping and block-based VSP to avoid transmitting the motion vector differences and use more precise motion vectors. Implementation details are different due to different platforms.

In the following paragraphs, we also use the term BVSP to indicate the backward-warping VSP approach in 3D-HEVC.

In 3D-HTM, video encoder 20 may typically apply texture first coding in common test conditions. Therefore, the corresponding non-base depth view is unavailable when decoding one non-base texture view. Therefore, the video coder may estimate the depth information and used this estimated depth information to perform BVSP.

In order to estimate the depth information for a block, the video coder may first derive a disparity vector from the neighboring blocks, and then use the derived disparity vector to obtain a depth block from a reference view.

In HTM 5.1 test model, there exists a process to derive a disparity vector predictor, known as NBDV (Neighboring Block Disparity Vector). Let (dvx, dvy) denotes the disparity vector identified from NBDV function, and the current block position is (blockx, blocky). The video coder may fetch a depth block at (blockx+dvx, blocky+dvy) in the depth image of the reference view. The fetched depth block generally has the same size of the current prediction unit (PU), and this fetched depth block may then be used to do backward warping for the current PU.

Figure 5:
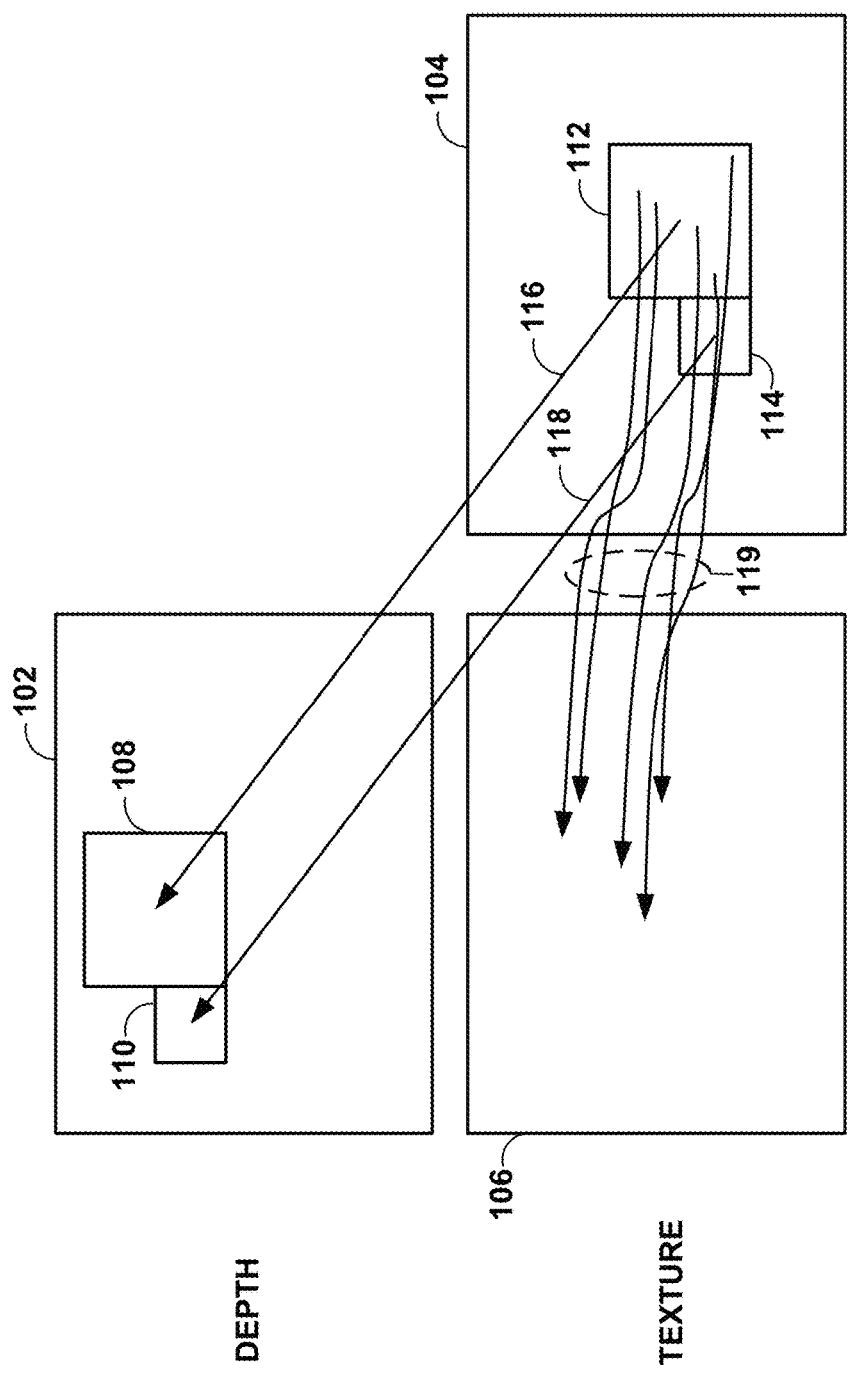
FIG. 5 is a diagram illustrating three steps for how a depth block from a reference view may be located and then used for backward warping view synthesis prediction (BVSP).

FIG. 5 is a diagram illustrating an example of how a depth block from the reference view may be located and then used for BVSP prediction. In the example of FIG. 5, depth picture 102 and texture picture 106 correspond to the same view, while texture picture 104 corresponds to a different view. In particular, texture picture 104 includes current block 112 being coded relative to texture picture 106, acting as a reference picture. A video coder may refer to neighboring block 114, which neighbors current block 112, to determine a disparity vector. Neighboring block 114 includes a previously determined disparity vector 118. Disparity vector 118 may be derived as a disparity vector 116 for current block 112. Thus, disparity vector 116 refers to depth block 108 in depth picture 102 of the reference view.

The video coder may then use pixels (that is, depth values) of depth block 108 to determine disparity values 119 for pixels (that is, texture values) of current block 112, for performing backward warping. The video coder may then synthesize values for a predicted block (i.e., a BVSP reference block) for current block 112 from the pixels identified by disparity values 119. The video coder may then predict current block 112 using this predicted block. For instance, during video encoding by video encoder 20, video encoder 20 may calculate pixel-by-pixel differences between the predicted block and current block 112 to produce a residual value, which video encoder 20 may then transform, quantize, and entropy encode. On the other hand, during video decoding by video decoder 30, video decoder 30 may entropy decode, inverse quantize, and inverse transform residual data, then combine the residual data (on a pixel-by-pixel basis) with the predicted block to reproduce current block 112.

If BVSP is enabled for a sequence, the NBDV process for inter-view motion prediction may be changed. The differences are underlined in the following paragraphs:

For each of the temporal neighboring blocks, if it uses a disparity motion vector, the disparity motion vector is returned as the disparity vector and it is further refined with the process described above.

For each of the spatial neighboring blocks, the following apply:

For each reference picture list 0 or reference picture list 1, the following apply If it uses a disparity motion vector, the disparity motion vector is returned as the disparity vector and it is further refined with the process described above.

Otherwise, if it uses BVSP mode, the associated motion vector is returned as the disparity vector. It is further refined in a similar way as described above. However, the maximum depth value is selected from all pixels of the corresponding depth block rather than four corner pixels.

For each of the spatial neighboring blocks, if the spatial neighboring block uses an IDV, the IDV is returned as the disparity vector and it is further refined with the process described above.

The introduced BVSP mode may be treated as a special inter-coded mode and a flag indicating the usage of BVSP mode may be maintained for each PU. Rather than signal the flag in the bit stream, a new merging candidate (BVSP merging candidate) may be added to the merge candidate list, where this flag may be dependent on whether the decoded merge candidate index corresponds to a BVSP merging candidate. The BVSP merging candidate is defined as follows:

Reference picture index for each reference picture list: −1

Motion vector for each reference picture list: the refined disparity vector

The inserted position of BVSP merging candidate may, in some examples, be dependent on the spatial neighboring blocks:

If any of the five spatial neighboring blocks (A0, A1, B0, B1 or B2) is coded with the BVSP mode, e.g., the maintained flag of the neighboring block is equal to 1, BVSP merging candidate is treated as the corresponding spatial merging candidate and inserted to the merge candidate list. In some examples, BVSP merging candidate may only be inserted to the merge candidate list once.

Otherwise (none of the five spatial neighboring blocks are coded with the BVSP mode), the BVSP merging candidate may be inserted to the merge candidate list just before the temporal merging candidates.

In some examples, during the combined bi-predictive merging candidate derivation process, additional conditions should be checked to avoid including the BVSP merging candidate.

Regarding the prediction derivation process, for each BVSP coded PU with its size denoted by N×M, the PU may be further partitioned into several sub-regions with the size equal to K×K (wherein K may be 4 or 2). For each sub-region, a separate disparity motion vector may be derived and each sub-region may be predicted from one block located by the derived disparity motion vector in the inter-view reference picture. In other words, the video coder may set the size of motion-compensation unit for BVSP coded PUs to K×K. In common test conditions, K may be set to 4.

Regarding the disparity motion vector derivation process, for each sub-region (4×4 block) within one PU coded with BVSP mode, the video coder may locate a corresponding 4×4 depth block in the reference depth view with the refined disparity vector aforementioned above. Secondly, the video coder selects the maximum value of the sixteen depth pixels in the corresponding depth block. Thirdly, the video coder converts the maximum value to the horizontal component of a disparity motion vector. The vertical component of the disparity motion vector may be set to 0.

3D-HTM also provides for inter-view candidate derivation process for skip/merge mode. Based on the disparity vector derived from DoNBDV scheme, video encoder 20 may add, if available, a new motion vector candidate, Inter-view Predicted Motion Vector Candidate (IPMVC), to AMVP and skip/merge modes. The inter-view predicted motion vector, if available, may comprise a temporal motion vector.

As skip mode generally utilized the same motion vector derivation process as merge mode, all processes described in this disclosure may apply to both merge and skip modes.

For the merge/skip mode, the inter-view predicted motion vector is derived by the following steps. First, video encoder 20 and video decoder 30 locate, using a disparity vector, a corresponding block of a current PU/CU in a reference view of the same access unit. Next, if the corresponding block is not intra-coded and not inter-view predicted and its reference picture has a POC value equal to that of one entry in the same reference picture list of current PU/CU, then video encoder 20 and video decoder 30 derive its motion information (prediction direction, reference pictures, and motion vectors), after converting the reference index based on POC, to be the inter-view predicted motion vector.

The corresponding block is defined as follows:
Denote a luma location (xP, yP) of the top-left luma sample of the current prediction unit relative to the top-left luma sample of the current picture, nPSW and nPSH denote the width and height of the current prediction unit, respectively, reference view order index refViewIdx, and a disparity vector mvDisp, the reference layer luma location (xRef, yRef) is derived by:

$$xRef = Clip3(0, PicWidthInSamples_L - 1, xP + ((nPSW - 1) \gg 1) + ((mvDisp[0] + 2) \gg 2))$$ (H 124)

$$yRef = Clip3(0, PicHeightInSamples_L - 1, yP + ((nPSH - 1) \gg 1) + ((mvDisp[1] + 2) \gg 2))$$ (H 125)

The video coder may set the corresponding block to the prediction unit that covers the luma location (xRef, yRef) in the view component with ViewIdx equal to refViewIdx.

Figure 6:
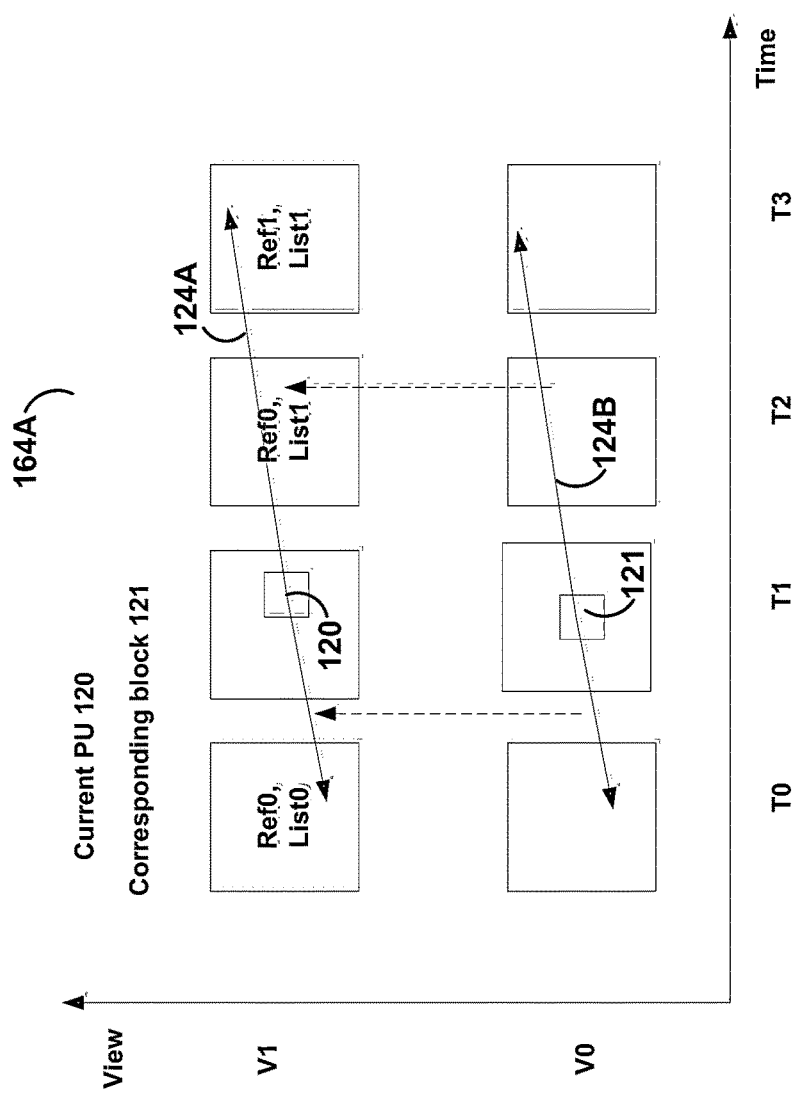
FIG. 6 is a diagram illustrating an example of the derivation process of an inter-view predicted motion vector candidate.

FIG. 6 is a diagram illustrating an example of the derivation process of the inter-view predicted motion vector candidate. For current block 120 in a first view (V1), video decoder 30 locates a corresponding block 121 in a different view (V0). Video decoder 30 may re-use the motion information of reference block 121 to derive motion information for current block 120. For example, if video decoder 30 used motion vector 124B to predict reference block 121, then video decoder 30 may use motion vector 124A to predict current block 120. Motion vector 124A and motion vector 124B are intended to represent two different instances of the same motion vector.

In addition, the video coder may convert the disparity vector to an inter-view disparity motion vector, which may then be added into merge candidate list in a different position from IPMVC, or possibly added into the AMVP candidate list in the same position as IPMVC when it is available. Either IPMVC or Inter-view Disparity Motion Vector Candidate (IDMVC) may be referred to as an 'inter-view candidate' in this context.

In the merge/skip mode, IPMVC, if available, may always be inserted before all spatial and temporal merging candidates to the merge candidate list. IDMVC may be inserted before the spatial merging candidate derived from A0.

3D-HEVC also provides for merge candidate list construction for texture coding. In this context, the video coder may first derive the disparity vector with the process of DoNBDV. With the disparity vector, the merging candidate list construction process in 3D-HEVC can be defined, as one example, as follows:

1. IPMVC insertion
   IPMVC is derived by the procedure described above. If it is available, it is inserted to the merge list.
2. Derivation process for spatial merging candidates and IDMVC insertion in 3D-HEVC
   Check the motion information of spatial neighboring PUs in the following order:
   A1, B1, B0, A0, or B2. Constrained pruning may then be performed by the following procedures:
   If A1 and IPMVC have the same motion vectors and the same reference indices, A1 is not inserted into the candidate list; otherwise it is inserted into the list.
   If B1 and A1/IPMVC have the same motion vectors and the same reference indices, B1 is not inserted into the candidate list; otherwise it is inserted into the list.
   If B0 is available, it is added to the candidate list. IDMVC is derived by the procedure described above. If it is available and it is different from the candidates derived from A1 and B1, it is inserted to the candidate list.
   If BVSP is enabled for the whole picture or for the current slice, then the BVSP merging candidate is inserted to the merge candidate list.
   If A0 is available, it is added to the candidate list.
   If B2 is available, it is added to the candidate list.
3. Derivation process for temporal merging candidate
   Similar to the temporal merging candidate derivation process in HEVC where the motion information of the co-located PU is utilized, however, the target reference picture index of the temporal merging candidate may be changed instead of fixing to be 0. When the target reference index equal to 0 corresponds to a temporal reference picture (in the same view) while the motion vector of the co-located prediction unit (PU) points to an inter-view reference picture, it is changed to another index which corresponds to the first entry of inter-view reference picture in the reference picture list. On the contrary, when the target reference index equal to 0 corresponds to an inter-view reference picture while the motion vector of the co-located prediction unit (PU) points to a temporal reference picture, it is changed to another index which corresponds to the first entry of temporal reference picture in the reference picture list.
4. Derivation process for combined bi-predictive merging candidates in 3D-HEVC
   If the total number of candidates derived from the above two steps are less than the maximum number of candidates, the same process as defined in HEVC is performed except the specification of 10CandIdx and 11CandIdx. The relationship among combIdx, 10CandIdx and 11CandIdx are defined in the table shown in FIG. 7.

5. Derivation process for zero motion vector merging candidates

The same procedure as defined in HEVC may be performed.

In the latest software, the total number of candidates in the MRG list is up to 6 and five_minus_max_num_merge_cand may be signaled to specify the maximum number of the MRG candidates subtracted from 6 in slice header. In some examples, five_minus_max_num_merge_cand is in the range of 0 to 5, inclusive.

Motion vector inheritance for depth coding is also provided. Motion vector inheritance (MVI) typically exploits the similarity of the motion characteristics between the texture images and its associated depth images.

Figure 8:
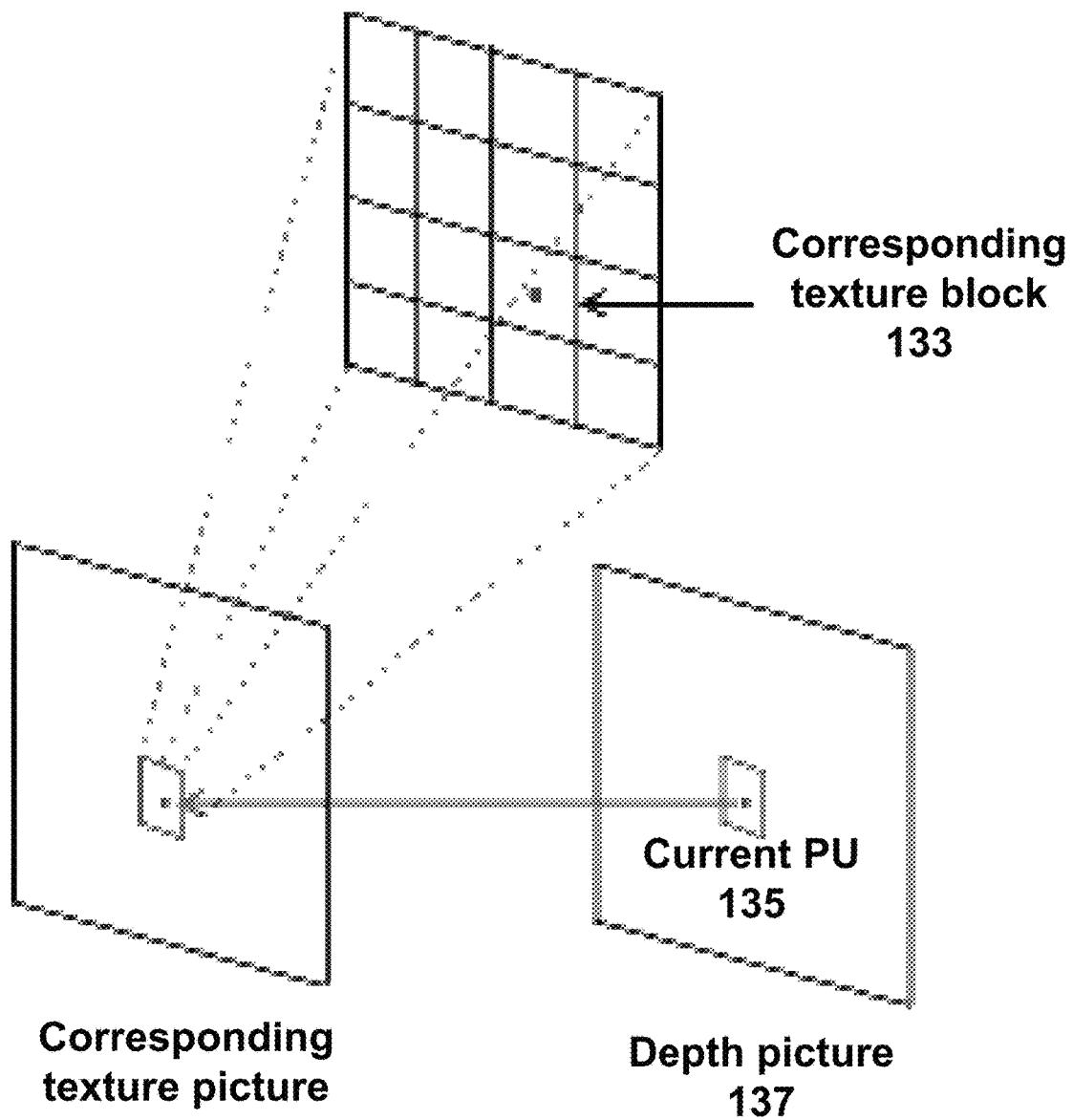
FIG. 8 shows an example derivation process for determining a motion vector inheritance (MVI) candidate where the corresponding texture block is selected as the 4×4 block located to the right bottom of the center of the current PU.

FIG. 8 shows an example of the derivation process of the MVI candidate where the corresponding texture block 133 is selected as the 4×4 block located to the right bottom of the center of the current PU 135. For a given PU in the depth picture 137, the MVI candidate may reuse the motion vectors and reference indices of the already coded corresponding texture block 133, if available.

In some examples, motion vectors with integer precision are used in depth coding while quarter precision of motion vectors is utilized for texture coding. As a result, the motion vector of the corresponding texture block may be scaled before using as a MVI candidate.

With the MVI candidate generation, the merge candidate list for the depth views is constructed as set forth in the following exemplary manner:

1. MVI insertion
   MVI is derived by the procedure described above. If it is available, it is inserted to the merge list.
2. Derivation process for spatial merging candidates and IDMVC insertion in 3D-HEVC
   Check the motion information of spatial neighboring PUs in the following order:
   A1, B1, B0, A0, or B2. Constrained pruning is performed by the following procedures:
      If A1 and MVI have the same motion vectors and the same reference indices, A1 is not inserted into the candidate list.
      If B1 and A1/MVI have the same motion vectors and the same reference indices, B1 is not inserted into the candidate list.
      If B0 is available, it is added to the candidate list.
      If A0 is available, it is added to the candidate list.
      If B2 is available, it is added to the candidate list.
3. Derivation process for temporal merging candidate
   Similar to the temporal merging candidate derivation process in HEVC where the motion information of the co-located PU is utilized, however, the target reference picture index of the temporal merging candidate may be changed as explained in Section 2.4.6 instead of fixing to be 0.
4. Derivation process for combined bi-predictive merging candidates in 3D-HEVC
   If the total number of candidates derived from the above two steps are less than the maximum number of candidates, the same process as defined in HEVC is performed except the specification of l0CandIdx and l1CandIdx. The relationship among combIdx, l0CandIdx and l1CandIdx are defined in the table 2.
5. Derivation process for zero motion vector merging candidates
   The same procedure as defined in HEVC is performed.
This coding tool may be referred to as "MPI" in this disclosure.

Figure 9:
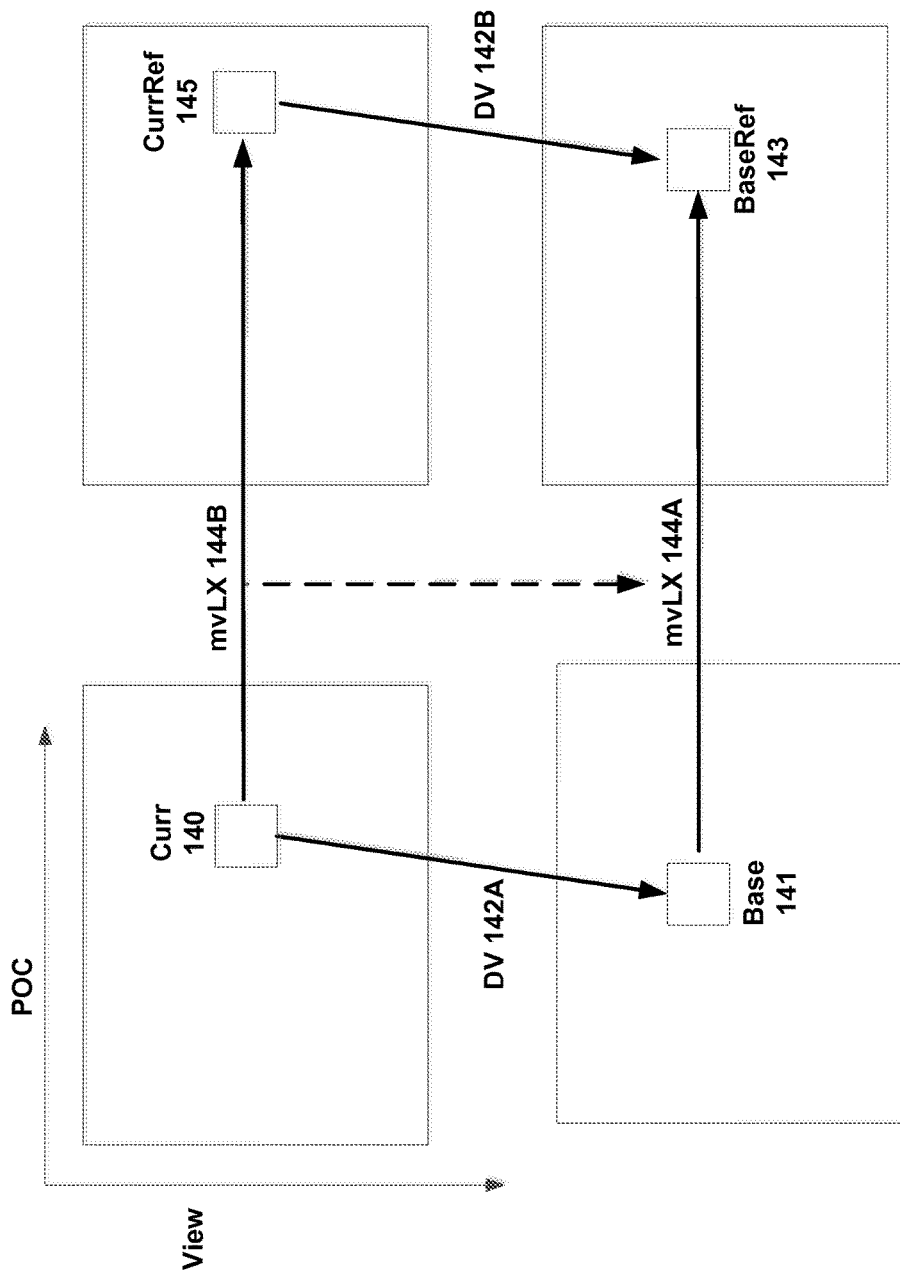
FIG. 9 is a diagram illustrating the prediction structure of advanced residual prediction (ARP) in multiview video coding and 3D video coding for one reference picture list.

In 3D-HEVC, advanced residual prediction (ARP), may be enabled for dependent texture views. FIG. 9 is a diagram illustrating one example of the prediction structure of ARP in multiview video coding and 3D video coding for one reference picture list. To get the predictor of one PU in one reference picture list, three blocks may be identified, i.e., in this example, the temporal reference block in current view (denoted by CurrRef 145), a corresponding block in the reference view located by the DV from NBDV process (denoted by Base 141) and the reference block in the reference view (denoted by BaseRef 143) by reusing the motion information of current block 140, as shown in FIG. 9. Then, the residual predictor may be calculated by the differences of two blocks in the reference view, i.e., BaseRef–Base. In addition, a weighting factor w (being 0, 1 or 0.5) may be further multiplied to the residual predictor and the weighted residual predictor may be added to current temporal reference block to generate the final prediction of current block for one reference picture list.

However, when current block uses an inter-view reference picture (in a different view) for one reference picture list, the residual prediction process may be disabled due to the missing of mvLX.

Similar to ARP design for temporal residual, when current prediction unit uses an inter-view reference picture, prediction of inter-view residual may be enabled. Firstly the inter-view residual within a different access unit may be calculated, then the calculated residual information may be used to predict the inter-view residual of the current block.

Figure 10:
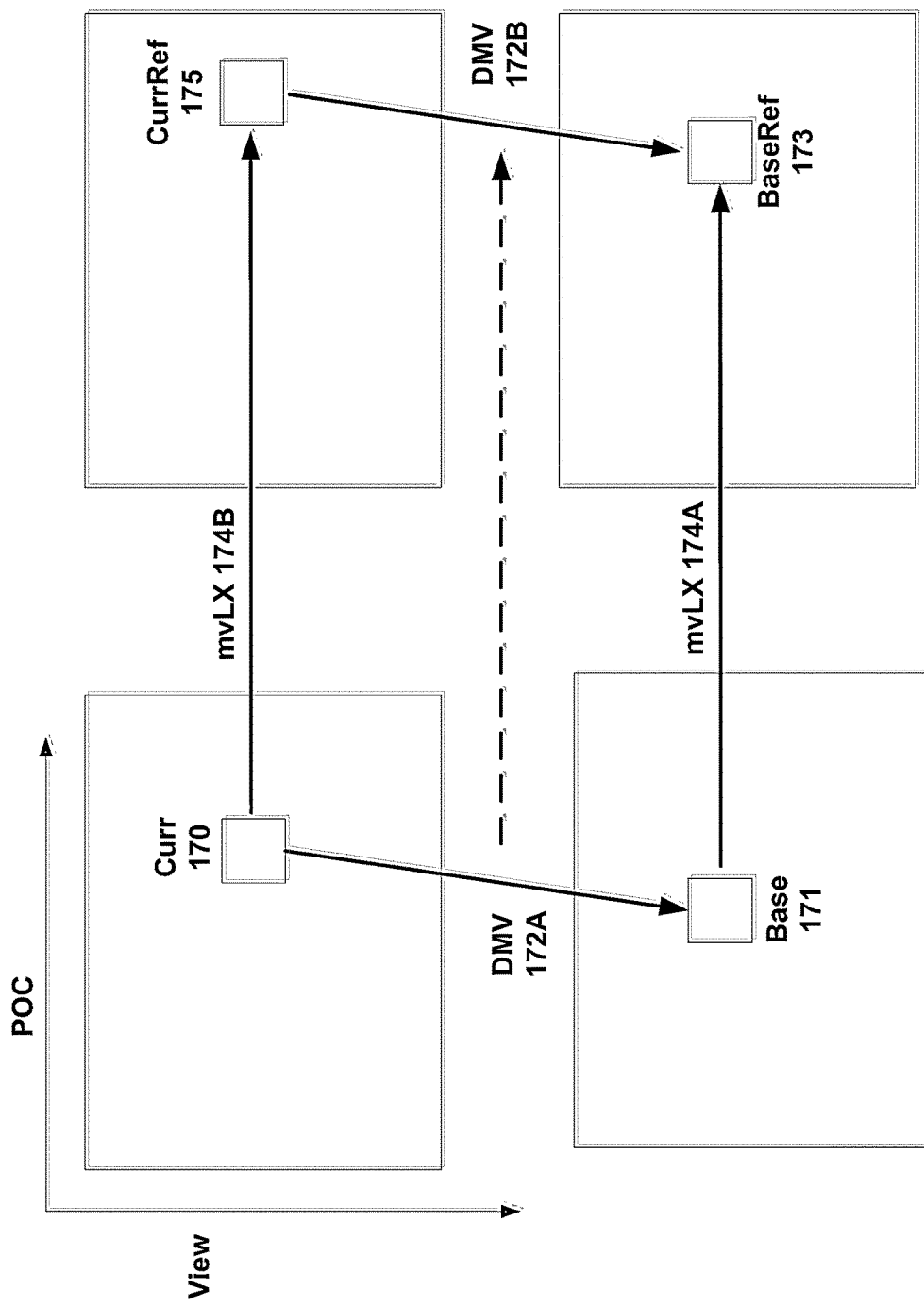
FIG. 10 is a diagram illustrating an example prediction structure of ARP for inter-view residual.

In this respect, three related blocks may be identified: the reference block in the reference view located by the disparity motion vector of the current block (denoted by Base); the reference block of Base in the reference view (denoted by BaseRef) located by the temporal motion vector (mvLX) and reference index, if available, contained by Base; and a reference block in current view (denoted by CurrRef) by reusing the temporal motion information from Base, as shown in the example of FIG. 10 discussed below.

With the identified three blocks, the residual predictor of the residual signal of current PU can be calculated as the difference between these two blocks in the different access unit: CurrRef–BaseRef. Furthermore, the inter-view predictor may be multiplied by a weighting factor as used in current ARP.

Similarly, the video coder may use a bi-linear filter to generate the three relative blocks as in current design of ARP for temporal residual prediction. Furthermore, when the temporal motion vector contained by Base points to a reference picture that is in a different access unit of the first available temporal reference picture of current PU, it may be firstly scaled to the first available temporal reference picture and the scaled motion vector may be used to locate two blocks in a different access unit.

FIG. 10 shows an example prediction structure for inter-view ARP. As shown in FIG. 10, for inter-view ARP, video decoder 30 identifies three related blocks for current block 170. Base 171 represents the reference block in the reference view located by the disparity motion vector (DMV 172A) of current block 170. BaseRef 173 represents the reference block of Base 171 in the reference view located by the temporal motion vector mvLX 174A and reference index, if available, contained by Base 171. CurrRef 175 represent a reference block in current view identified by reusing the temporal motion information from Base 171. Thus, video decoder 30 may locate CurrRef 175 using mvLX 174B, where mvLX 174A and mvLX 174B represent two instances of the same motion vector. DMV 172B is equal to DMV 172A as included in FIG. 10 to illustrate that the disparity between Curr 170 and Base 171 is equal to the disparity between CurrRef 175 and BaseRef 173. DMV 172B may not actually correspond to a disparity motion vector used or generated by video decoder 30.

With the identified three blocks, video decoder 30 may calculate the residual predictor of the residual signal for current PU (i.e. Curr 170) as the difference between CurrRef and BaseRef. Furthermore, the inter-view predictor may be multiplied by a weighting factor (w). Therefore, the final predictor of the current block (Curr 170) determined by video decoder 30 is denoted as Base+w*(CurrRef−BaseRef).

Video decoder 30 may use bi-linear filtering to generate the three relative blocks as in some known designs of ARP for temporal residual prediction. Furthermore, when the temporal motion vector contained by Base 171 points to a reference picture that is in a different access unit of the first available temporal reference picture of current PU, video decoder 30 may scale the temporal motion vector to the first available temporal reference picture and the scaled motion vector may be used to locate two blocks in a different access unit.

The following discusses one example process by which the video coder may derive the target reference index for ARP. In 3D-HEVC, a target reference index RpRefIdxLX is chosen for each picture that can use ARP.

Firstly a temporal reference picture is identified corresponding to each reference picture list (RefPicList0 or RefPicList1).

Secondly, with such a temporal reference picture, the reference views in the reference picture list of the active inter-layer reference picture (as defined in the slice header) are inspected one by one. If the active inter-layer reference picture with view order index equal to refViewIdx has a temporal reference picture (still present in DPB) with the same POC as the RpRefIdxLX of the current picture, the variable RefRpRefAvailFlagLX[refViewIdx] is set equal to 1. Otherwise, RefRpRefAvailFlagLX[refViewIdx] is set equal to 0. If the NBDV process returns a view order index (denoted by i) which corresponds to RefRpRefAvailFlagLX[i] equal to 0, ARP should not apply.

The current 3D-HEVC design in subclause H.8.3.9 (Derivation process for the target reference index for residual prediction) is as follows.
This process is invoked when the current slice is a P or B slice.
The variables RpRefIdxL0 and RpRefIdxL1 are set equal to −1, the variables RpRefPicAvailFlagL0 and RpRefPicAvailFlagL1 are set equal to 0.
The following applies for X in the range of 0 to 1, inclusive:
When X is equal to 0 or the current slice is a B slice the following applies:
For i in the range of 0 to num_ref_idx_1X_active_minus1, inclusive, the following applies:
When PicOrderCnt(RefPicListX[i]) is not equal to PicOrderCntVal and RpRefPicAvailFlagLX is equal to 0, the following applies:

RpRefIdxLX=i    (H-32)

RpRefPicAvailFlagLX=1    (H-33)

[Ed. (GT): There might be pictures present in the DPB fulfilling the above conditions, but having e.g. a different value of DepthFlag compared to the current layer.].

The variable RpRefPicAvailFlag is set equal to (RpRefPicAvailFlagL0||RpRefPicAvailFlagL1).
When RpRefPicAvailFlag is equal to 1, the following applies for X in the range of 0 to 1, inclusive:
When X is equal to 0 or the current slice is a B slice the following applies:
a. For i in the range of 0 to NumActiveRefLayerPics−1, inclusive, the following applies:
i. The variable refViewIdx is set equal to ViewIdx(RefPicListX[i]).
ii. The variable RefRpRefAvailFlagLX[refViewIdx] is set equal to 0.
iii. When RpRefPicAvailFlagLX is equal to 1 and there is a picture picA in the DPB with PicOrderCnt(picA) equal to PicOrderCnt(RefPicListX[RpRefIdxLX]), ViewIdx(picA) equal to refViewIdx, DepthFlag(picA) equal to 0 and marked as "used for reference", RefRpRefAvailFlagLX[refViewIdx] is set equal to 1.

In this subclause, there is a clear error in this bullet "i. The variable refViewIdx is set equal to ViewIdx(RefPicListX[i]).", since the i-th active inter-layer reference picture, rather than the i-th reference picture.

To further improve the coding efficiency of ARP, sub-PU (block) level ARP has been proposed in JCT3V-F0124.

In this proposal, when ARP is applied to either temporal residual or inter-view residual, the motion information associated with a block covering the center position of the reference block located by current PU's motion vector is used either to update the DV from NBDV or to update the temporal motion vector used to generate the final residual predictor. In some cases, the reference block may contain different motion information. Therefore, better coding gain may be expected if considering the multiple motion information within the reference block.

One way is to perform the ARP on block-level. More specifically, each PU is firstly split, in this example, into several blocks (8×8 block size is used in the simulations), and each block share the same motion information as current PU.

Figure 11A:
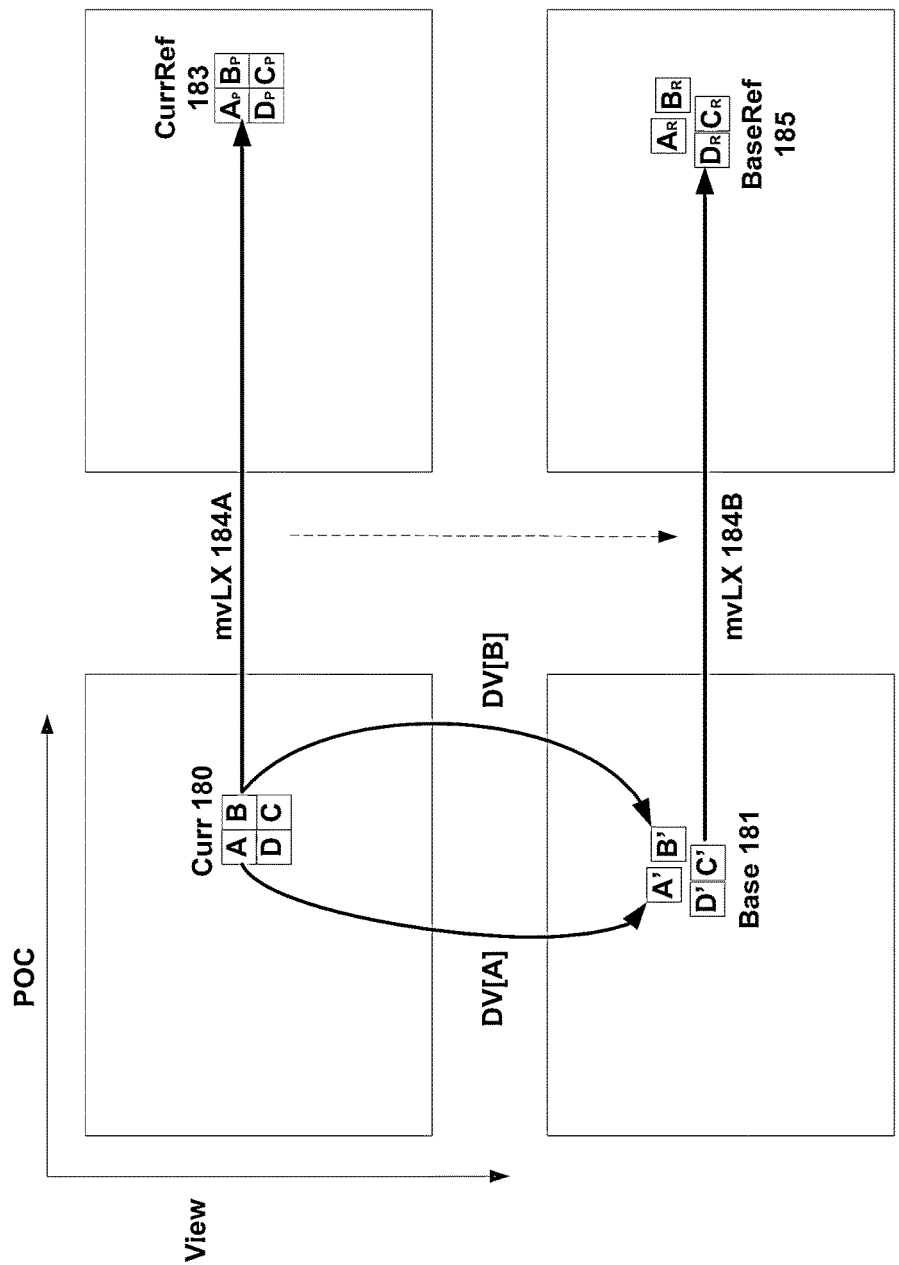
FIGS. 11A and 11B are diagrams illustrating example prediction structures for block-level ARP for temporal residual and inter-view residual.
Figure 11B:
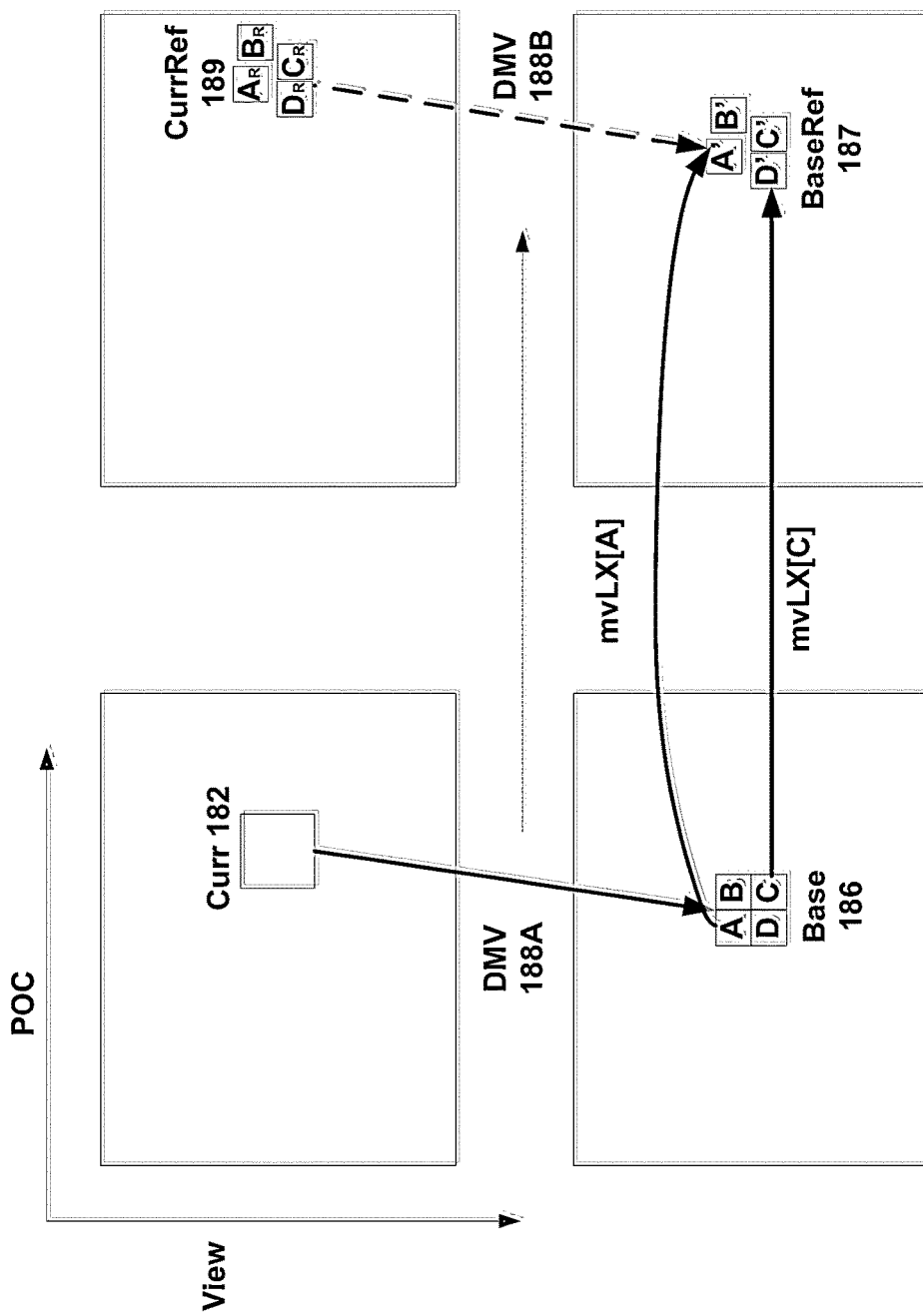

For each 8×8 block, the disparity vector or temporal motion vector information may be updated for each block. When current "ARP coded" PU has a temporal reference picture, the disparity vectors of each 8×8 block within current PU may be different, as shown in the example of FIG. 11A discussed below. When current ARP coded PU has an inter-view reference picture, the temporal motion vectors of each 8×8 block within current PU may be different, as shown in the example of FIG. 11B discussed below.

Furthermore, the residual of chroma components may not be coded if the current PU is coded with ARP.

FIG. 11A shows an example prediction structure of block-level temporal ARP. In the example of FIG. 11A, Curr 180 represents a PU that is divided into four 8×8 blocks, labeled A-D in FIG. 11A. Base 181 represents four reference blocks (labeled A'-D') in a reference/base view derived by the disparity vectors of Curr 180. Block A' of Based 181 is identified using the disparity vector of block A (shown in FIG. 11A as DV[0]), and Block B' is identified using the disparity vector (shown in FIG. 11A as DV[1]). Although not explicitly shown in FIG. 11A, blocks C' and D' may likewise be identified using the disparity vectors of block C and D.

The derived motion vector (i.e., disparity vector in temporal ARP) may be updated for each 8×8 block. For temporal ARP, the default derivedMv (denoted by DV[i] for the i-th 8×8 block in FIG. 11A) is firstly set to be the DV from an NBDV process. When the block covering the center position of the i-th 8×8 block within CurrRef contains a disparity motion vector, DV[i] is updated to be that disparity motion vector. Thus, as shown in FIG. 11A, blocks A'-D' may be positioned differently, relative to one another, than blocks A-D are relative to one another. CurrRef 183 represents four blocks ($A_P$-$D_P$) in the same view as curr 180 derived by the temporal motion vector (shown as mvLX 184A in FIG. 11A) of Curr 180. BaseRef 185 represents the four blocks ($A_R$-$D_R$) in the same view as Base 181 derived by the temporal motion vector of the current block (mvLX 184B). In the example of FIG. 11A, mvLX 184A and mvLX 184B are intended to represent two different applications of the same motion vector. That is, mvLX 184A and mvLX 184B have the same x-component and y-component.

The residual predictor, in the example of FIG. 11A, is denoted as BaseRef-Base, where the subtraction operation applies to each pixel of the denoted pixel arrays. A weighting factor (w) is further multiplied to the residual predictor.

information from Base 186. Thus, for example, video decoder 30 locates $A_R$ using mvLX[A], locates $B_R$ using mvLX[B], and so on. With the three identified blocks, video decoder 30 may calculate the residual predictor of the residual signal of current PU as the difference between CurrRef-BaseRef. Which may be in different access units. Furthermore, the inter-view predictor may be multiplied by a weighting factor (w). Therefore, the final predictor of the current block determined by video decoder 30 is denoted as Base[N]+w*(CurrRef[$N_R$]−BaseRef[N']).

The following describes how the video coder may specify or otherwise determine active inter-layer references in a slice header.

In MV-HEVC, the active inter-layer reference pictures may be signaled in a slice header for those reference pictures that are be put into the initial reference picture list of the current picture.

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   ... | |
|   if( nuh_layer_id > 0 && !all_ref_layers_active_flag && | |
|       NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1 ) { | |
|       if( !max_one_active_ref_layer_flag ) | |
|         num_inter_layer_ref_pics_minus1 | u(v) |
|       if( NumActiveRefLayerPics != NumDirectRefLayers[ nuh_layer_id ] ) | |
|         for( i = 0; i < NumActiveRefLayerPics; i++ ) | |
|           inter_layer_pred_layer_idc[ i ] | u(v) |
|     } | |
|   } | |
|   ... | |
| } | |

Therefore, the final predictor for blocks A-D determined by video decoder 30 are denoted as CurrRef[$N_P$]+w*(Base [N']−BaseRef[$N_R$]), with N corresponding to A-D.

FIG. 11B shows an example prediction structure of block-level inter-view ARP. In the example of FIG. 11B, video decoder 30 identifies three related blocks of current block 182. Base 186 represents the four reference blocks (A-D) in the reference view located by the disparity motion vector (DMV 188A) of current block 182. BaseRef 187 represents the four reference blocks (A'-D') of Base 186 in the reference view located by the temporal motion vector mvLX[N] and reference index, if available, contained by Base 186, where N corresponds to blocks A-D. For inter-view ARP, the default derivedMv (denoted by mvLX[i] for the i-th 8×8 block in FIG. 11B) may be set to the temporal motion vector associated with a block covering the center position of Base, as in current ARP. When the block covering the center position of the i-th 8×8 block within Base contains a temporal motion vector, mvLX[i] is updated to be that temporal motion vector. Thus, as shown in FIG. 11A, blocks A'-D' may be positioned differently, relative to one another, than blocks A-D are relative to one another.

CurrRef 189 represent four reference blocks ($A_R$-$D_R$) in the current view identified by reusing the temporal motion The number of active inter-layer reference pictures and each of the inter-layer reference pictures may be signaled in the slice header. Even the current layer has a reference layer signaled in the VPS, if it is not signaled/derived as a reference layer, due to the slice level signaling, the picture of such a layer may not be inserted into its reference picture list.

The above may result in the following potential problems. The current 3D-HEVC requires video decoder 30 to check the whole reference picture list to find the default inter-layer reference picture for NBDV. This process may be unnecessary. Moreover, in 3D-HEVC, it has not yet been determined how the actual depth reference layers should be signaled in the slice level for a texture picture, and similarly how the active texture reference layer (only the associated one) should be signaled in the slice header for a depth picture.

In accordance with the techniques described in this disclosure, video encoder 20 may determine a default inter-layer reference picture for an NBDV process without having to assess each reference picture stored to a reference picture list, perform the NBDV process using the default inter-layer reference picture to determine a disparity vector, and encode a current picture of the three dimensional video data based on the disparity vector.

That is, techniques related to 3D-HEVC are described in this disclosure for the derivation of the default NBDV picture for which a default disparity vector is associated and the derivation of the target reference index for ARP. In other words, the techniques of this disclosure may modify 3D-HEVC (e.g., relative to Test Model 4, as noted above) such that the active reference layers signaled in slice header (e.g., by inter_layer_pred_layer_idc[i]) may only concern the layers that have the same property of being texture or depth as the current picture. Thus, active layers may be used for indicating the inter-layer reference pictures that may be put into the reference picture list of the current picture.

According to one technique of this disclosure, in 3D-HEVC the active reference layers signaled in a slice header (e.g., by inter_layer_pred_layer_idc[i]) may only relate to the layers that have the same property of being texture or depth as the current picture. Thus, such active layers be used for indicating the inter-layer reference pictures that may be put into the reference picture list of the current picture but not for indicating other types of dependencies.

The default view order index of the NBDV picture may be derived to be the view order index of the first active inter-layer reference as signaled in slice header or derived in slice level.

According to one technique of this disclosure, video encoder 20 may signal, in the VPS for example, that a texture layer is dependent on a depth layer if DoNBDV or BVSP is performed using information from the depth layer. Alternatively, video encoder 20 may not signal this dependency but instead, video encoder 20 and video decoder 30 may derive the dependency. For example, if texture layer A depends on texture layer B, then texture layer A also depends on a depth layer C (if present), when texture layer C belongs to the same view as texture layer B.

In the VPS, video encoder 20 may signal a depth layer to depend or not depend on a texture layer if the texture layer belongs to the same view as the depth layer. The singling mechanism can be the same as in current MV-HEVC, thus regardless whether a dependent layer is texture or depth.

Video decoder 30 may, for example, determine, based on direct dependent layers of a current texture layer signaled in VPS, that the current texture layer of the video data is dependent on a depth layer of the video data; and process the current texture layer using the depth layer. In other words, video decoder 30 may determine, based on one or more parameters signaled in a parameter set (e.g. a VPS), that a texture layer of the video data is dependent on a depth layer of the video data and, in response to the texture layer being dependent on the depth layer, process the depth layer. As part of processing the depth layer, video decoder 30 may predict a block of the texture layer using at least one of a DoNBDV process or a BVSP process using information obtained from the depth layer. Video decoder 30 may receive, separate from the parameter set, e.g. in a slice header for a slice of the texture layer, an indication of active reference slice layers for the slice of the texture layer. Video decoder 30 may receive, separate from the parameter set, e.g. in a slice header for a slice of the depth layer, an indication of active reference slice layers for the slice of the depth layer. In these examples, depth layer may be a base depth layer, and the texture layer may be a non-base texture layer. The depth layer may correspond to a different texture layer than the dependent texture layer.

Alternatively, a flag (e.g. texture_dep_flag) may be signaled for the same purpose. For example, if this flag is 1, the current depth layer may depend on the texture layer in the same view. Otherwise, the current depth layer does not depend on the texture layer in the same view. In these and other examples, textureDepFlag can be derived for either of the above two cases, only when textureDepFlag is 1, MPI is enabled and mpi_flag[layerId] is signaled. Furthermore, only when textureDepFlag is equal to 1, DMM mode 4 (partitioning of the depth block depends on the co-located texture block) may be enabled. Alternatively, such a dependency may not be signaled but instead may always assumed.

In these and other examples, video encoder 20 may derive a dependency of a texture layer to a depth layer based on one or more dependencies between different depth and texture layers. In these and other examples, video encoder 20 may derive a dependency of a texture layer to a depth layer based on one or more dependencies between different depth and texture layers. Video encoder 20 may determine whether a depth layer depends on a texture layer based on whether the texture layer belongs to a same view as the depth layer.

That is, for each texture slice, the slice level dependency for a current texture picture to a reference depth layer may not belong to the active reference layers signaled in slice header. In some examples, it is assumed always to be potentially the same as signaled in the VPS. In these examples, the slice level dependency for a current texture picture to a reference depth layer is derived in a way that if a texture reference layer is an active reference layer of the current slice (meaning the picture in the access unit of the active reference layer may be required for decoding of current picture), the depth reference layer of the same view, if present in the same access unit, is a reference layer of the current slice/picture. In some examples, such dependent depth layers for a texture layer may be explicitly signaled in the slice header of the current texture slice.

For each depth slice, a flag in the slice header may be present indicating whether it depends on the texture picture of the same view and of the same access unit. Alternatively, such a flag is not signaled and always assumed to be 1, meaning dependency exists. Alternatively, such a flag is only signaled when MPI (mpi_flag[layerId] being 1 for the current depth layer) or DMM mode 4 are enabled for the whole depth layer.

Alternatively, such a flag is not present and inferred to be equal to 0 if textureDepFlag is equal to 0 or if both MPI and DMM are disabled for the whole depth layer. When such a flag is equal to 0, no dependency to the texture layer of the same access unit in the same view is allowed and coding tools depending on that are disabled. The disabled tools include MPI and DMM 4 for the current slice/picture.

In other words, video encoder 20 may, when determining the default inter-layer reference picture, determine the default inter-layer reference picture from a slice header associated with the current picture.

In these and other examples, the current picture comprises a current texture picture. When encoding the current picture, video encoder 20 may perform view synthesis prediction (VPS) based on the disparity vector to encode the current texture picture. When performing the NBDV process, video encoder 20 may determine a slice level dependency for the current texture picture to a reference depth layer such that the dependency does not belong to active reference layers signaled in a slice header associated with the current texture picture but to that signaled for performing the VPS.

In these and other examples, video encoder 20 may further determine whether a depth slice depends on a texture picture of a same view and of a same access unit from the slice header.

In operation, video encoder 20 may operate in accordance with the following techniques specified in terms of a revised version of the 3D-HEVC standard, where revisions are shown using double brackets with [[italics]] to denote deletion or underline to show additions.

This aspect corresponds to the case as described above, wherein active reference layers may only concern those with the same texture/depth property as the current picture.

The changes are for default NBDV reference picture and the target reference index of the ARP.

It is proposed that the derivation of default reference view order index should be simplified in a way similar as in the derivation process of the target reference picture in ARP. In addition, bug fixes are provided for the derivation process of the target reference picture in ARP.

The modified text is underlined and deleted text is shown in double brackets with [[italics]].

H.8.3.8 Derivation Process for the Default Reference View Order Index for Disparity Derivation This process is invoked when the current slice is a P or B slice.

The variable DefaultViewIdx is set equal to ViewOrderIdx [RefPicLayerId[0]].

H.8.3.9 Derivation Process for the Target Reference Index for Residual Prediction This process is invoked when the current slice is a P or B slice.

The variables RpRefIdxL0 and RpRefIdxL1 are set equal to −1, the variables RpRefPicAvailFlagL0 and RpRefPicAvailFlagL1 are set equal to 0.

The following applies for X in the range of 0 to 1, inclusive:

When X is equal to 0 or the current slice is a B slice the following applies:
 For i in the range of 0 to num_ref_idx_1X_active_minus1, inclusive, the following applies:
  When PicOrderCnt(RefPicListX[i]) is not equal to PicOrderCntVal and RpRefPicAvailFlagLX is equal to 0, the following applies:

$RpRefIdxLX=i$       (H-32)

$RpRefPicAvailFlagLX=1$       (H-33)

[Ed. (CY): this is addressed below by "DepthFlag (picA) equal to 0".]

The variable RpRefPicAvailFlag is set equal to (RpRefPicAvailFlagL0∥RpRefPicAvailFlagL1).

When RpRefPicAvailFlag is equal to 1, the following applies for X in the range of 0 to 1, inclusive:

When X is equal to 0 or the current slice is a B slice the following applies:
 For i in the range of 0 to NumActiveRefLayerPics−1, inclusive, the following applies:
  The variable refViewIdx is set equal to ViewOrderIdx [RefPicLayerId[i]].
  The variable RefRpRefAvailFlagLX[refViewIdx] is set equal to 0.
  When RpRefPicAvailFlagLX is equal to 1 and there is a picture picA in the DPB with PicOrderCnt(picA) equal to PicOrderCnt(RefPicListX[RpRefIdxLX]), ViewIdx (picA) equal to refViewIdx, DepthFlag(picA) equal to 0 and marked as "used for reference", RefRpRefAvailFlagLX[refViewIdx] is set equal to 1.

Moreover, various aspects of the techniques may enable a video coder to determining a first non-zero set of active reference layers, determine a second non-zero set of active reference layers, and code the three dimensional video data based on one or more of the first non-zero set of active reference layers and the second non-zero set of active reference layers.

In these and other examples, the first non-zero set of active reference layers includes only texture reference layers for a current texture layer of the three dimensional video data to be coded. In these and other examples, the second non-zero set of active reference layers includes any remaining layers for the current texture layer. In these and other examples, the second non-zero set of active reference layers includes any remaining layers.

In these and other examples, the first non-zero set of active reference layers includes only depth reference layers for a depth texture layer of the three dimensional video data to be coded. In these and other examples, the second non-zero set of active reference layers includes any remaining layers for the current depth layer. In these and other examples, the second non-zero set of active reference layers includes any remaining layers.

In these and other examples, coding the three dimensional video data comprises encoding the three dimensional video data with video encoder 20.

In these and other examples, the three dimensional video data comprises encoded three dimensional video data, and coding the three dimensional video data comprises decoding the encoded three dimensional video data with video decoder 30.

That is, when active reference layers including depth layers for a current texture picture or texture layers for a current depth layer. The video coder may create two sets of active reference layers. In some examples, the first set may have the same property active reference layer set, containing only texture reference layers for a current texture layer or containing only depth reference layers for a current depth layer. In these and other examples, the second set is the different property active reference layer set, containing the remaining active reference layers. The decoding processes in 3D-HEVC which require the active reference layers may be replaced by the same property active layer set.

In operation, video encoder 20 and/or video decoder 30 may operate in accordance with the following techniques specified in terms of a revised version of the 3D-HEVC standard, where revisions are shown using double brackets with [[italics]] to denote deletion or underlining to show additions.

The semantics of inter_layer_pred_layer_idc is modified as follows.

inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers [nuh_layer_id])) bits. The value of inter_layer_pred_layer_idc[i] shall be in the range of 0 to NumDirectRefLayers [nuh_layer_id]−1, inclusive. When not present, the value of inter_layer_pred_layer_idc[i] is inferred to be equal to refLayerPicIdc[i].

When i is greater than 0, inter_layer_pred_layer_idc[i] shall be greater than inter_layer_pred_layer_idc[i−1].

The variables RefPicLayerId[i] for all values of i in the range of 0 to NumActiveRefLayerPics−1, inclusive, are derived as follows:

```
for (i=0, j=0,k=0; i<NumActiveRefLayerPics; i++)
  {lid=RefLayerId[nuh_layer_id][inter_layer_pred_lay-
      er_idc[i]]if(VpsDepthFlag[lid]==VpsDepthFlag
      [nuh_layer_id])
    RefPicLayerId[j++]=lid
  else
    RefPicLayerIdDiffProperty[k++]=lid
  }
```
NumActiveRefLayerPics is set equal to j.

It is a requirement of bitstream conformance that for each value of i in the range of 0 to NumActiveRefLayerPics−1, inclusive, either of the following two conditions shall be true:

The value of
max_tid_il_ref_pics_plus1[LayerIdxInVps[RefPicLayerId[i] ] ][LayerIdxInVps[nuh_layer_id] ] is greater than TemporalId.

The values of
max_tid_il_ref_pics_plus1[LayerIdxInVps[RefPicLayerId[i] ] ][LayerIdxInVps[nuh_layer_id] ] and TemporalId are both equal to 0 and the picture in the current access unit with nuh_layer_id equal to RefPicLayerId[i] is an IRAP picture.

Note that RefPicLayerId now represents the same property active reference layer set and RefPicLayerIdDiffProperty now represents the different property active reference layer set.

H.8.3.8 Derivation Process for the Default Reference View Order Index for Disparity Derivation This process is invoked when the current slice is a P or B slice.

The variable DefaultViewIdx is set equal to ViewOrderIdx [RefPicLayerId[0] ].

H.8.3.9 Derivation Process for the Target Reference Index for Residual Prediction This process is invoked when the current slice is a P or B slice.

The variables RpRefIdxL0 and RpRefIdxL1 are set equal to −1, the variables RpRefPicAvailFlagL0 and RpRefPicAvailFlagL1 are set equal to 0.

The following applies for X in the range of 0 to 1, inclusive:
  When X is equal to 0 or the current slice is a B slice the following applies:
    For i in the range of 0 to num_ref_idx_1X_active_minus1, inclusive, the following applies:
      When PicOrderCnt(RefPicListX[i]) is not equal to PicOrderCntVal and RpRefPicAvailFlagLX is equal to 0, the following applies:

$RpRefIdxLX$=i  (H-32)

$RpRefPicAvailFlagLX$=1 (H-33)

The variable RpRefPicAvailFlag is set equal to (RpRefPicAvailFlagL0∥RpRefPicAvailFlagL1).

When RpRefPicAvailFlag is equal to 1, the following applies for X in the range of 0 to 1, inclusive:
  When X is equal to 0 or the current slice is a B slice the following applies:
    For i in the range of 0 to NumActiveRefLayerPics−1, inclusive, the following applies:
      The variable refViewIdx is set equal to ViewOrderIdx[RefPicLayerId[i]].
      The variable RefRpRefAvailFlagLX[refViewIdx] is set equal to 0.
      When RpRefPicAvailFlagLX is equal to 1 and there is a picture picA in the DPB with PicOrderCnt (picA) equal to PicOrderCnt(RefPicListX[RpRefIdxLX]), ViewIdx(picA) equal to refViewIdx, DepthFlag (picA) equal to 0 and marked as "used for reference", RefRpRefAvailFlagLX [refViewIdx] is set equal to 1.

Various aspects of the techniques may also enable a video coder to determine a non-zero set of active reference layers based on a determination of whether a reference layer is a texture layer or a depth layer, and code the three dimensional video data based on the determined non-zero set of active reference layers.

In operation, a video coder may operate in accordance with the following techniques specified in terms of a revised version of the 3D-HEVC standard, where revisions are shown using double brackets with [[italics]] to denote deletion or underlining to show additions.

This aspect may achieve the same purpose as the immediately foregoing aspect but by not potentially creating two sets of active reference layers. In this case, decoding processes depending on the active reference layers may need to check whether the reference layer is a texture layer or depth layer.

H.8.3.8 Derivation Process for the Default Reference View Order Index for Disparity Derivation This process is invoked when the current slice is a P or B slice.

The variable DefaultViewIdx is set equal to ViewOrderIdx [RefPicLayerId[i] ], wherein i is the first one in ascending order starting from 0 through NumActiveRefLayerPics−1, inclusive that satisfies the condition of VpsDepthFlag [RefPicLayerId[i] ] being equal to VpsDepthFlag [nuh_layer_id].

H.8.3.9 Derivation Process for the Target Reference Index for Residual Prediction This process is invoked when the current slice is a P or B slice.

The variables RpRefIdxL0 and RpRefIdxL1 are set equal to −1, the variables RpRefPicAvailFlagL0 and RpRefPicAvailFlagL1 are set equal to 0.

The following applies for X in the range of 0 to 1, inclusive:
  When X is equal to 0 or the current slice is a B slice the following applies:
    For i in the range of 0 to num_ref_idx_1X_active_minus1, inclusive, the following applies:
      When PicOrderCnt(RefPicListX[i]) is not equal to PicOrderCntVal and RpRefPicAvailFlagLX is equal to 0, the following applies:

$RpRefIdxLX$=i  (H-32)

$RpRefPicAvailFlagLX$=1 (H-33)

The variable RpRefPicAvailFlag is set equal to (RpRefPicAvailFlagL0∥RpRefPicAvailFlagL1).

When RpRefPicAvailFlag is equal to 1, the following applies for X in the range of 0 to 1, inclusive:
  When X is equal to 0 or the current slice is a B slice the following applies:
    For i in the range of 0 to NumActiveRefLayerPics−1, inclusive, the following applies:
      The variable refViewIdx is set equal to ViewOrderIdx [RefPicLayerId[i] ].
      The variable RefRpRefAvailFlagLX[refViewIdx] is set equal to 0.

When RpRefPicAvailFlagLX is equal to 1 and there is a picture picA in the DPB with PicOrderCnt(picA) equal to PicOrderCnt(RefPicListX[RpRefIdxLX]), ViewIdx (picA) equal to refViewIdx, DepthFlag(picA) equal to 0 and marked as "used for reference", RefRpRefAvailFlagLX[refViewIdx] is set equal to 1.

Figure 12:
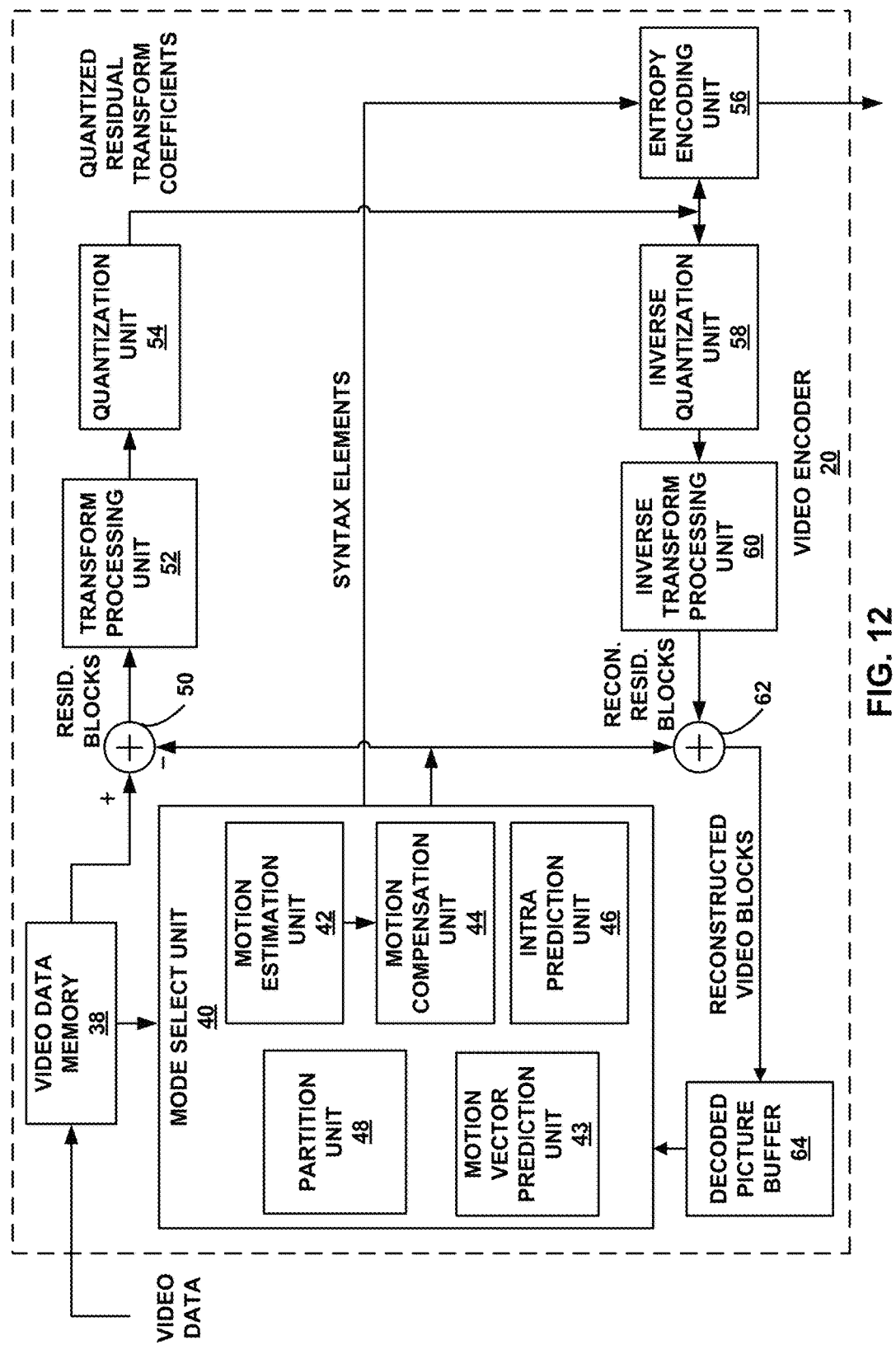
FIG. 12 is a block diagram illustrating an example video encoder that may implement the techniques described in this disclosure.

FIG. 12 is a block diagram illustrating an example video encoder 20 that may implement the techniques described in this disclosure for temporal motion vector prediction. Video encoder 20 may perform intra- and inter-coding of video blocks within video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 12, video encoder 20 receives video data to be encoded. In the example of FIG. 12, video encoder 20 includes video data memory 38, a mode select unit 40, summer 50, transform processing unit 52, quantization unit 54, entropy encoding unit 56, and decoded picture buffer 64. Mode select unit 40, in turn, includes motion estimation unit 42, motion compensation unit 44, intra-prediction unit 46, and partition unit 48. For video block reconstruction, video encoder 20 also includes inverse quantization unit 58, inverse transform processing unit 60, and summer 62. A deblocking filter (not shown in FIG. 12) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

Video data memory 38 may store video data to be encoded by the components of video encoder 20. The video data stored in video data memory 38 may be obtained, for example, from video source 18. Decoded picture buffer 64 may be a reference picture memory that stores reference video data for use in encoding video data by video encoder 20, e.g., in intra- or inter-coding modes. Video data memory 38 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and decoded picture buffer 64 may be provided by the same memory device or separate memory devices. In various examples, video data memory 38 may be on-chip with other components of video encoder 20, or off-chip relative to those components.

During the encoding process, video encoder 20 receives a picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42, motion vector prediction unit 43, and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64, which may also be referred to as a reference picture buffer. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. Accordingly, in general, data for a motion vector may include a reference picture list, an index into the reference picture list (ref_idx), a horizontal component, and a vertical component. The reference picture may be selected from a first reference picture list (List 0), a second reference picture list (List 1), or a combined reference picture list (List c), each of which identify one or more reference pictures stored in decoded picture buffer 64.

Motion estimation unit 42 may generate and send a motion vector that identifies the predictive block of the reference picture to entropy encoding unit 56 and motion compensation unit 44. That is, motion estimation unit 42 may generate and send motion vector data that identifies the reference picture list containing the predictive block, an index into the reference picture list identifying the picture of the predictive block, and a horizontal and vertical component to locate the predictive block within the identified picture.

In some examples, rather than sending the actual motion vector for a current PU, motion vector prediction unit 43 may predict the motion vector to further reduce the amount of data needed to communicate the motion vector. In this case, rather than encoding and communicating the motion vector itself, motion vector prediction unit 43 may generate a motion vector difference (MVD) relative to a known (or knowable) motion vector. The known motion vector, which may be used with the MVD to define the current motion vector, can be defined by a so-called motion vector predictor (MVP). In general, to be a valid MVP, the motion vector being used for prediction must point to the same reference picture as the motion vector currently being coded.

In some examples, as described in greater detail with respect to FIGS. 6 and 7 below, motion vector prediction unit 43 may build a motion vector predictor candidate list that includes several neighboring blocks in spatial and/or temporal directions as candidates for MVP. When multiple motion vector predictor candidates are available (from multiple candidate blocks), motion vector prediction unit 43 may determine a motion vector predictor for a current block according to predetermined selection criteria. For example, motion vector prediction unit 43 may select the most accurate predictor from the candidate set based on analysis of encoding rate and distortion (e.g., using a rate-distortion cost analysis or other coding efficiency analysis). In other examples, motion vector prediction unit 43 may generate an average of the motion vector predictor candidates. Other methods of selecting a motion vector predictor are also possible.

Upon selecting a motion vector predictor, motion vector prediction unit 43 may determine a motion vector predictor index (mvp_flag), which may be used to inform a video decoder (e.g., such as video decoder 30) where to locate the MVP in a reference picture list containing MVP candidate blocks. Motion vector prediction unit 43 may also determine the MVD between the current block and the selected MVP. The MVP index and MVD may be used to reconstruct the motion vector.

In some examples, motion vector prediction unit 43 may instead implement a so-called "merge mode," in which motion vector prediction unit 43 may "merge" motion information (such as motion vectors, reference picture indexes, prediction directions, or other information) of predictive video block with a current video block. Accordingly, with respect to merge mode, a current video block inherits the motion information from another known (or knowable) video block. Motion vector prediction unit 43 may build a merge mode candidate list that includes several neighboring blocks in spatial and/or temporal directions as candidates for merge mode. Motion vector prediction unit 43 may determine an index value (e.g., merge_idx), which may be used to inform a video decoder (e.g., such as video decoder 30) where to locate the merging video block in a reference picture list containing merging candidate blocks.

Motion vector prediction unit 43 may identify a motion vector predictor, e.g., for generating an MVD or merging, in multiview coding. For example, motion vector prediction unit 43 may identify a disparity motion vector from a block in a different view component than a current block to predict the motion vector for the current block. In other examples, motion vector prediction unit 43 may identify a temporal motion vector from a block in a different view component than a current block to predict the motion vector for the current block.

Regarding disparity motion vector prediction, motion vector prediction unit 43 may identify a disparity motion vector candidate from a candidate block to predict a motion vector for a video block currently being coded (referred to as "the current block"). The current block may be located in the same picture as the candidate block (e.g., spatially neighbor the candidate block), or may be located in another picture within the same view as the candidate block. In some examples, motion vector prediction unit 43 may identify a motion vector predictor that refers to a reference picture in different view than a motion vector for the current block. In such instances, according to the techniques of this disclosure, motion vector prediction unit 43 may scale the motion vector predictor based on a difference in camera locations between the two views (e.g., the view referred to by the motion vector predictor and the view referred to by the current motion vector). For example, motion vector prediction unit 43 may scale the disparity motion vector predictor according to a difference between the two views. In some examples, the difference between the two views may be represented by a difference between view identifiers (view_id) associated with the views.

Regarding temporal motion vector prediction, motion vector prediction unit 43 may identify a temporal motion vector candidate from a candidate block in a different view than a current block to predict a motion vector for the current block. For example, motion vector prediction unit 43 may identify a temporal motion vector predictor candidate in a first view that refers to a block in a picture at another temporal location of the first view. Motion vector prediction unit 43 may use the identified temporal motion vector predictor candidate to predict a motion vector associated with a current block in a second, different view. The candidate block (which includes the motion vector predictor candidate) and the current block may be co-located. However, the relative location of the candidate block may be offset from the current block, due to a disparity between the two views.

Motion compensation, performed by motion compensation unit 44, may involve fetching or generating the predictive block based on the motion vector determined by motion estimation unit 42 and/or the information from motion vector prediction unit 43. Again, motion estimation unit 42, motion vector prediction unit 43, and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent picture.

In accordance with various aspects of the techniques described in this disclosure, mode select unit 40 may determine a default inter-layer reference picture for an NBDV process without having to assess each reference picture stored to a reference picture list, perform the NBDV process using the default inter-layer reference picture to determine a disparity vector, and decode a current picture of the encoded three dimensional video data based on the disparity vector as described above in more detail.

Moreover, in accordance with various aspects of the techniques described in this disclosure, mode select unit 40 may either separately or in conjunction with other aspects of the techniques described in this disclosure determine a first non-zero set of active reference layers, determine a second non-zero set of active reference layers, and code the three dimensional video data based on one or more of the first non-zero set of active reference layers and the second non-zero set of active reference layers.

Moreover, in accordance with various aspects of the techniques described in this disclosure, mode select unit 40 may either separately or in conjunction with other aspects of the techniques described in this disclosure determine a non-zero set of active reference layers based on a determination of whether a reference layer is a texture layer or a depth layer, and code the three dimensional video data based on the determined non-zero set of active reference layers.

Moreover, in accordance with various aspects of the techniques described in this disclosure, mode select unit 40 may, in response to a current texture layer of the video data being dependent on a depth layer of the video data, signal direct dependent layers in a VPS.

Figure 13:
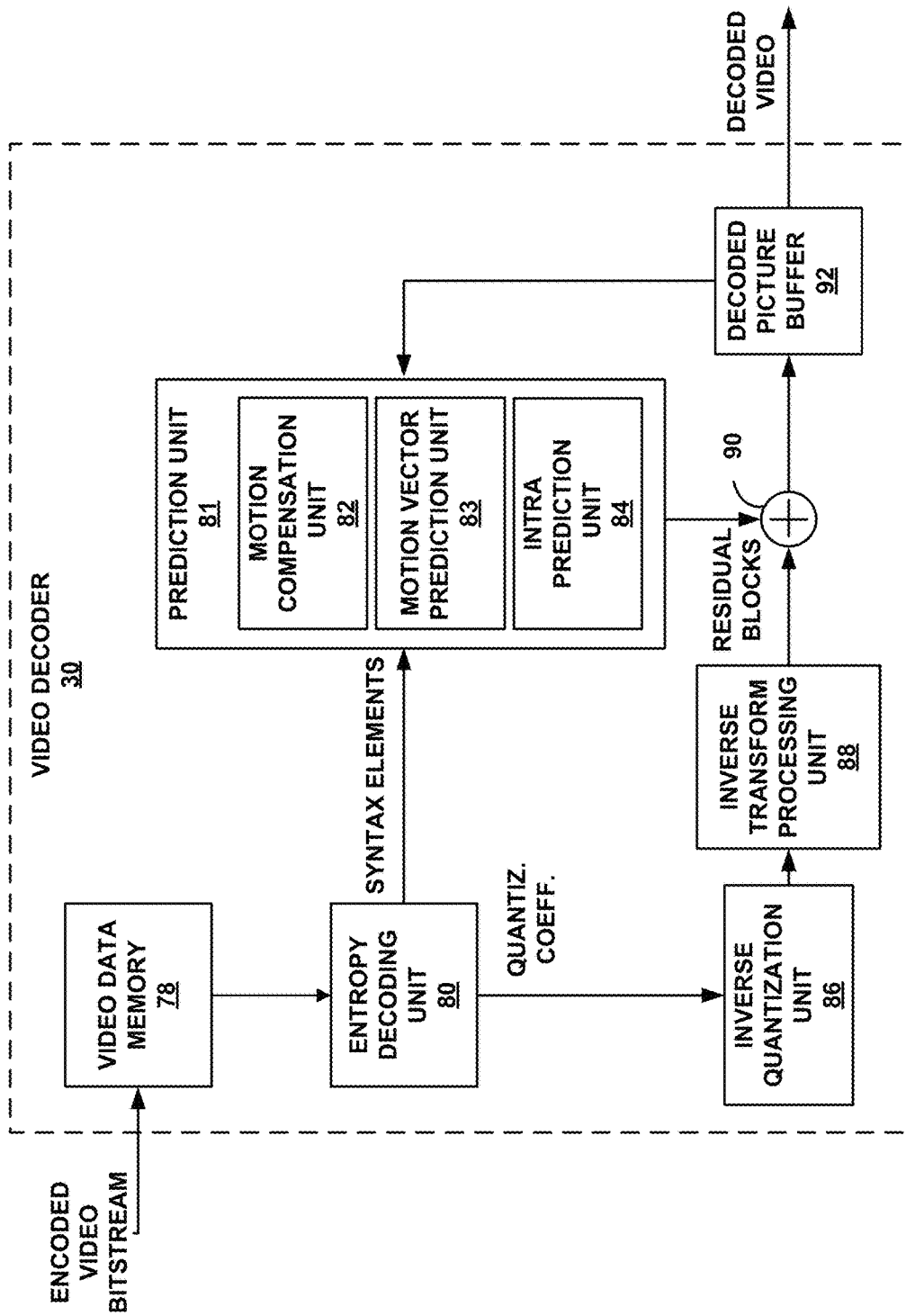
FIG. 13 is a block diagram illustrating an example video decoder that may implement the techniques described in this disclosure.

FIG. 13 is a block diagram illustrating an example video decoder 30 that may implement the techniques described in this disclosure for predicting motion vectors in multiview coding. In the example of FIG. 13, video decoder 30 includes video data memory 78, an entropy decoding unit 80, prediction unit 81, inverse quantization unit 86, inverse transform processing unit 88, summer 90, and decoded picture buffer 92. Prediction unit 81 includes motion compensation unit 82 and intra-prediction unit 84.

Video data memory 78 may store video data, such as an encoded video bitstream, to be decoded by the components of video decoder 30. The video data stored in video data memory 78 may be obtained, for example, from computer-readable medium 16, e.g., from a local video source, such as a camera, via wired or wireless network communication of video data, or by accessing physical data storage media. Video data memory 78 may form a coded picture buffer (CPB) that stores encoded video data from an encoded video bitstream. Decoded picture buffer 92 may be a reference picture memory that stores reference video data for use in decoding video data by video decoder 30, e.g., in intra- or inter-coding modes. Video data memory 78 and decoded picture buffer 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 78 and decoded picture buffer 92 may be provided by the same memory device or separate memory devices. In various examples, video data memory 78 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

For example, by way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

When the video slice is coded as an intra-coded (I) slice, intra-prediction unit 84 of prediction unit 81 may generate prediction data for a video block of the current video slice based on a signaled intra prediction mode and data from previously decoded blocks of the current picture. When the picture is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1, using default construction techniques based on reference pictures stored in decoded picture buffer 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. In some examples, motion compensation unit 82 may receive certain motion information from motion vector prediction unit 83.

Motion vector prediction unit 83 may receive prediction data indicating where to retrieve motion information for a current block. For example, motion vector prediction unit 83 may receive motion vector prediction information such as an MVP index (mvp_flag), MVD, merge flag (merge_flag), and/or merge index (merge_idx) and use such information to identify motion information used to predict a current block. That is, as noted above with respect to video encoder 20, according to aspects of this disclosure, motion vector prediction unit 83 may receive an MVP index (mvp_flag) and MVD, and use such information to determine a motion vector used to predict a current block. Motion vector prediction unit 83 may generate a list of MVP or merge candidates. According to aspects of this disclosure, the MVP and/or merge candidates may include one or more video blocks located in a different view than a video block currently being decoded.

Motion vector prediction unit 83 may use an MVP or merge index to identify the motion information used to predict the motion vector of a current block. That is, for example, motion vector prediction unit 83 may identify an MVP from a list of reference picture using the MVP index (mvp_flag). Motion vector prediction unit 83 may combine the identified MVP with a received MVD to determine the motion vector for the current block. In other examples, motion vector prediction unit 83 may identify a merge candidate from a list of reference pictures using a merge index (merge_idx) to determine motion information for the current block. In any event, after determining motion information for the current block, motion vector prediction unit 83 may generate the predictive block for the current block.

Motion vector prediction unit 83 may determine a motion vector predictor in multiview coding. For example, motion vector prediction unit 83 may receive information specifying a disparity motion vector from a block in a different view component than a current block that is used to predict the motion vector for the current block. In other examples, motion vector prediction unit 83 may receive information identifying a temporal motion vector from a block in a different view component than a current block that is used to predict the motion vector for the current block.

Regarding disparity motion vector prediction, motion vector prediction unit 83 may predict a disparity motion vector for the current block from a candidate block. The candidate block may be located in the same picture as the current block (e.g., spatially neighbor the candidate block), or may be located in another picture within the same view as the current block. The candidate block may also be located in a picture of a different view, but in the same time instance as the current block.

For example, with respect to either MVP or merge mode, the target picture and reference picture for a disparity motion vector "A" of the current block to be predicted are known (previously determined). Assume for purposes of explanation that the motion vector from a candidate block is "B." If motion vector B is not a disparity motion vector, motion vector prediction unit 83 may consider the candidate block unavailable (e.g., not available for predicting motion vector A). That is, motion vector prediction unit 83 may disable the ability to use the candidate block for purposes of motion vector prediction.

If the motion vector B is a disparity motion vector and the reference picture of motion vector B belongs to the same view as that of the reference picture of disparity motion vector A, and the target picture of motion vector B belongs to the same view as the target picture of the disparity motion vector A, motion vector prediction unit 83 may use the motion vector B directly as a candidate predictor of motion vector A. Otherwise, motion vector prediction unit 83 may scale the disparity motion vector B before it can be used as a candidate predictor of motion vector A. In such instances, according to the techniques of this disclosure, motion vector prediction unit 83 may scale the disparity motion vector based on a view distance of motion vector A and a view distance of motion vector B. For example, motion vector prediction unit 83 may scale disparity motion vector B by a scaling factor that is equal to view distance of motion vector A divided by view distance of motion vector B. In some examples, motion vector prediction unit 83 may perform such scaling using the view identifiers of the reference pictures and target pictures.

Regarding temporal motion vector prediction, motion vector prediction unit 83 may predict a temporal motion vector for the current block from a candidate block in a different view than that of the current block. For example, motion vector prediction unit 83 may identify a temporal motion vector predictor candidate having a target picture in a first view and refers to a block in a reference picture at another temporal location of the first view.

For example, with respect to either MVP or merge mode, the target picture and the reference picture for a temporal motion vector "A" of the current block to be predicted are known (i.e., previously determined). Assume for purposes of explanation that the motion vector from a candidate block is "B." If the motion vector B from the candidate block is not a temporal motion vector, motion vector prediction unit 83 may consider the candidate block unavailable (e.g., not available for predicting motion vector A). That is, in some examples, motion vector prediction unit 83 may disable the ability to use the candidate block for purposes of motion vector prediction.

If the motion vector B is a temporal motion vector, and the POC of the reference picture of motion vector B is the same as the reference picture of the motion vector A, and the POC of the target picture of motion vector B is the same as the target picture of the motion vector B, motion vector prediction unit 83 may use the motion vector B directly as a candidate predictor of motion vector A. Otherwise, motion vector prediction unit 83 may scale the temporal motion vector B based on temporal distance. The candidate block (which includes the motion vector predictor candidate) and the current block may be co-located in a different view. However, the relative location of the candidate block may be offset from the current block, due to a disparity between the two views.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform processing unit 88 may determine the manner in which transforms were applied to residual data. That is, for example, inverse transform processing unit 88 may determine an RQT that represents the manner in which transforms (e.g., DCT, integer transform, wavelet transform, or one or more other transforms) were applied to the residual luma samples and the residual chroma samples associated with a block of received video data.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in decoded picture buffer 92, which stores reference pictures used for subsequent motion compensation. Decoded picture buffer 92 also stores decoded video for later presentation on a display device, such as display device 32 of FIG. 1.

According to aspects of this disclosure, prediction unit 81 of video decoder 30 may determine a default inter-layer reference picture for an NBDV process without having to assess each reference picture stored to a reference picture list, perform the NBDV process using the default inter-layer reference picture to determine a disparity vector, and decode a current picture of the encoded three dimensional video data based on the disparity vector, as described above in more detail.

In these and other examples, when determining the default inter-layer reference picture, prediction unit 81 may determine a default view order index of the default inter-layer reference picture based on a view order index of a first active inter-layer reference.

In these and other examples, prediction unit 81 may determine the first active inter-layer reference from a slice header associated with the current picture.

In these and other examples, prediction unit 81 may determine the first active inter-layer reference in a slice level.

In these and other examples, prediction unit 81 may, when decoding the current picture, perform view synthesis prediction (VSP) based on the disparity vector to decode the current picture.

In these and other examples, prediction unit 81 may, when performing VSP, determine a texture layer to be dependent on a depth layer when the NBDV process is a depth oriented NBDV (DoNBDV) process or the VSP process is a backward-warping VPS (BVSP) process.

In these and other examples, prediction unit 81 may, when performing VPS, derive a dependency of a texture layer to a depth layer based on one or more dependencies between different depth and texture layers.

In these and other examples, prediction unit 81 may, when performing VPS, determine whether a depth layer depends on a texture layer based on whether the texture layer belongs to a same view as the depth layer.

In these and other examples, prediction unit 81 may, when determining the default inter-layer reference picture, determine the default inter-layer reference picture from a slice header associated with the current picture.

In these and other examples, the current picture comprises a current texture picture. When decoding the current picture, prediction unit 81 may perform VSP based on the disparity vector to decode the current texture picture. When performing the NBDV process, prediction unit 81 may determine a slice level dependency for the current texture picture to a reference depth layer such that the dependency does not belong to active reference layers signaled in a slice header associated with the current texture picture but to that signaled for performing the VSP.

In these and other examples, prediction unit 81 may determine whether a depth slice depends on a texture picture of a same view and of a same access unit from the slice header.

According to various aspects of the techniques described in this disclosure, prediction unit 81 may, either in conjunction with or separately from other aspects of the techniques described in this disclosure, determine a first non-zero set of active reference layers, determine a second non-zero set of active reference layers, and code the three dimensional video data based on one or more of the first non-zero set of active reference layers and the second non-zero set of active reference layers.

According to various aspects of the techniques described in this disclosure, prediction unit 81 may, either in conjunction with or separately from other aspects of the techniques described in this disclosure, determining a non-zero set of active reference layers based on a determination of whether a reference layer is a texture layer or a depth layer, and code the three dimensional video data based on the determined non-zero set of active reference layers.

Figure 14:
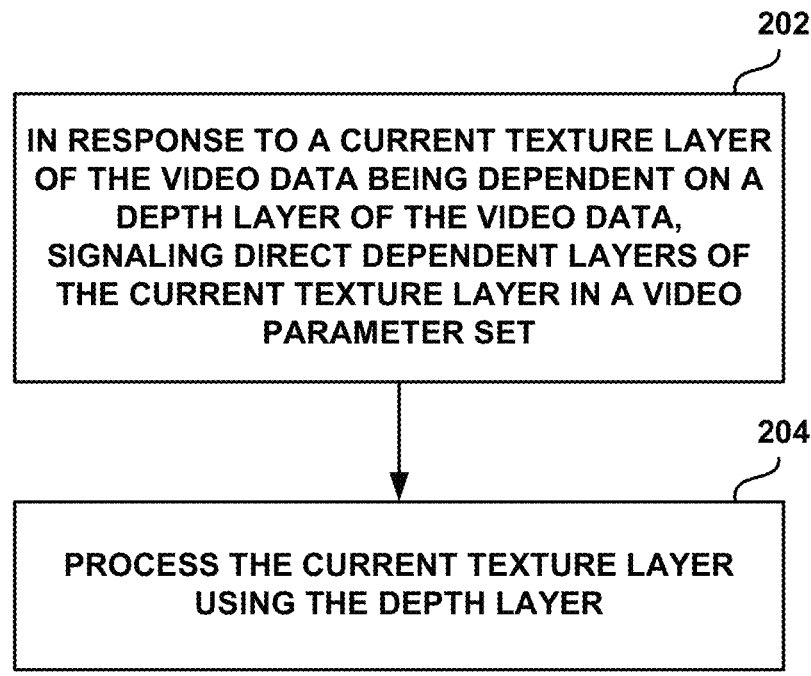
FIG. 14 is a flowchart illustrating an example method for encoding video data, according to techniques described in this disclosure.

FIG. 14 is a flowchart illustrating an example method for encoding video data, according to techniques described in this disclosure. The techniques of FIG. 14 will be described with reference to a video encoder, such as video encoder 20. Video encoder 20, in response to a current texture layer of the video data being dependent on a depth layer of the video data, signaling direct dependent layers in a VPS (202). The depth layer belongs to a different view than the current texture layer. Video encoder 20 processes the current texture layer using the depth layer (204). In response to predicting a block of the current texture layer using at least one of a DoNBDV process or a BVSP process using information obtained from the depth layer, video encoder 20 determines the current texture layer of the video data to be dependent on the depth layer. In some examples, in additional to texture to depth dependency, depth to texture dependency may also be signaled in the VPS.

Video encoder 20 signals separately from the direct dependent layers signaled in the VPS, for a slice of the texture layer, direct dependent texture layers used for forming active reference layers for the slice of the texture layer. In this context, signaling may include generating one or more syntax elements for inclusion in the encoded video data.

Figure 15:
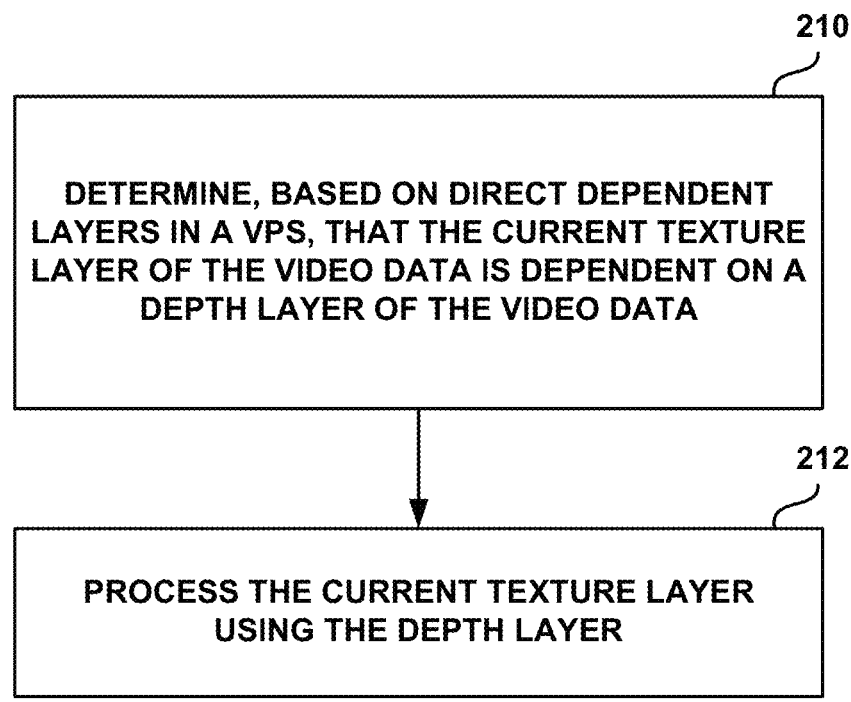
FIG. 15 is a flowchart illustrating an example method for processing video data, according to techniques described in this disclosure.

FIG. 15 is a flowchart illustrating an example method for processing video data, according to techniques described in this disclosure. The techniques of FIG. 15 will be described with reference to a video processing device. The video processing device may, for example, include a video decoder, such as video decoder 30 or may also be a network entity such as a media aware network entity (MANE). The video processing device determines, based on direct dependent layers signaled in a VPS, that the current texture layer of the video data is dependent on a depth layer of the video data (210). The video processing device may, for example, receive in the VPS one or more syntax elements that identify the direct dependent layers. The syntax elements may, for example, identify depth layers upon which the current texture layer depends. The depth layer may belong to a different view than the current texture layer. The video processing devices processes the current texture layer using the depth layer (212).

In some examples, in additional to texture to depth dependency, depth to texture dependency may also be signaled in the VPS. For example, video decoder 20 may determine, based on the direct dependent layers signaled in the VPS, that a current depth layer of the video data is dependent on a texture layer of the video data.

The video processing device may further determine, based on direct dependent layers signaled in the VPS, that the current depth layer of the video data is dependent on a second texture layer of the video data. The video processing device may further predict a block of the current texture layer using at least one of a DoNBDV process or a BVSP process using information obtained from the depth layer.

Video decoder 30 may separate from the direct dependent layers signaled in the video parameter set, for a slice of the texture layer, direct dependent texture layers used for forming active reference layers for the slice of the texture layer. Video decoder 20 may separate from the direct dependent layers signaled in the video parameter set, for a slice of the depth layer, direct dependent depth layers used for forming active reference layers for the slice of the depth layer. In other words, after determining the mixed (texture and depth) dependent layers, video decoder 30 may perform a decoding process to separate the mixed dependent layers into the depth dependent layers and texture dependent layers. In some instances, based on for instance slice-level signaling, only one of these two subsets may be used to formulate the active reference layers.

In instances where the video processing device includes a video decoder, processing the current texture layer using the depth layer may include predicting a block of the depth layer using information obtained from the current texture layer and/or predicting a block of the current texture layer using information obtained from the depth layer. In instances where the video processing device includes a MANE, processing the current texture layer may include performing a sub-bitstream extraction process on the video data.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of processing three-dimensional (3D) video data, the method comprising:
    determining, based on direct dependent layers signaled in a video parameter set, that a current texture layer of the video data is dependent on a depth layer of the video data due to at least one block of the current texture layer being predicted using one or more blocks of the depth layer, wherein the current texture layer belongs to a first view;
    determining, based on the direct dependent layers signaled in the video parameter set, that the depth layer of the video data is dependent on a second texture layer of the video data due to at least one block of the depth layer being predicted using one or more blocks of the second texture layer, wherein the second texture layer and the depth layer belong to a second view that is different than the first view;
    processing the current texture layer using the depth layer;
    processing the depth layer using the second texture layer; and
    outputting decoded video data comprising the current texture layer and the second texture layer.

2. The method of claim 1, further comprising:
    predicting a block of the current texture layer using at least one of a depth oriented NBDV (DoNBDV) process or a backward-warping view synthesis prediction (BVSP) process using information obtained from the depth layer.

3. The method of claim 1, further comprising;
    separating from the direct dependent layers signaled in the video parameter set, for a slice of the texture layer, direct dependent texture layers used for forming active reference layers for the slice of the texture layer.

4. The method of claim 1, further comprising;
    separating from the direct dependent layers signaled in the video parameter set, for a slice of the depth layer, direct dependent depth layers used for forming active reference layers for the slice of the depth layer.

5. The method of claim 4, wherein the active reference layers comprise reference layers from which blocks of the slice of the depth layer are predicted.

6. The method of claim 1, wherein processing the current texture layer using the depth layer comprises:
    predicting a block of the depth layer using information obtained from the current texture layer.

7. The method of claim 1, further comprising:
    predicting a block of the current texture layer using information obtained from the depth layer.

8. The method of claim 1, wherein the method is performed by a video decoder.

9. A method of encoding three-dimensional (3D) video data, the method comprising:

in response to a current texture layer of the video data being dependent on a depth layer of the video data, signaling direct dependent layers in a video parameter set indicating that the current texture layer of the video data is dependent on the depth layer of the video data due to at least one block of the current texture layer being predicted using one or more blocks of the depth layer, wherein the current texture layer belongs to a first view;

in response to the depth layer of the video data being dependent on a second texture layer of the video data due to at least one block of the depth layer being predicted using one or more blocks of the second texture layer, signaling direct dependent layers in the video parameter set indicating that the depth layer of the video data is dependent on the second texture layer of the video data, wherein the second texture layer and the depth layer belong to a second view that is different than the first view;

processing the current texture layer using the depth layer;

processing the depth layer using the second texture layer; and output encoded video data comprising the current texture layer, the depth layer, and the second texture layer.

10. The method of claim 9, further comprising:
in response to predicting a block of the current texture layer using at least one of a depth oriented NBDV (DoNBDV) process or a backward-warping view synthesis prediction (BVSP) process using information obtained from the depth layer, determining the current texture layer of the video data to be dependent on the depth layer.

11. The method of claim 9, further comprising:
separating from the direct dependent layers signaled in the video parameter set, for a slice of the texture layer, direct dependent texture layers used for forming active reference layers for the slice of the texture layer.

12. A video decoding device comprising:
a memory configured to store video data; and
one or more processors configured to:
determine, based on direct dependent layers signaled in a video parameter set, that a current texture layer of the video data is dependent on a depth layer of the video data due to at least one block of the current texture layer being predicted using one or more blocks of the depth layer, wherein the current texture layer belongs to a first view;
determine, based on the direct dependent layers signaled in the video parameter set, that the depth layer of the video data is dependent on a second texture layer of the video data due to at least one block of the depth layer being predicted using one or more blocks of the second texture layer, wherein the second texture layer and the depth layer belong to a second view that is different than the first view;
process the current texture layer using the depth layer;
process the depth layer using the second texture layer; and
output decoded video data comprising the current texture layer and the second texture layer.

13. The video coding device of claim 12, wherein the one or more processors are further configured to:
predict a block of the current texture layer using at least one of a depth oriented NBDV (DoNBDV) process or a backward-warping view synthesis prediction (BVSP) process using information obtained from the depth layer.

14. The video coding device of claim 12, wherein the one or more processors are further configured to:
separate from the direct dependent layers signaled in the video parameter set, for a slice of the texture layer, direct dependent texture layers used for forming active reference layers for the slice of the texture layer.

15. The video coding device of claim 12, wherein the one or more processors are further configured to:
signal separately from the direct dependent layer signaled in the video parameter set, for a slice of the depth layer, the direct dependent depth layers used for forming active reference layers for the slice of the depth layer.

16. The video coding device of claim 15, wherein the active reference layers comprise reference layers from which blocks of the slice of the depth layer are predicted.

17. The video coding device of claim 12, wherein to process the current texture layer, the one or more processors predict a block of the depth layer using information obtained from the current texture layer.

18. The video coding device of claim 12, wherein the one or more processors are further configured to predict a block of the current texture layer using information obtained from the depth layer.

19. The device of claim 12, wherein the device comprises at least one of:
an integrated circuit;
a microprocessor; or
a wireless communication device that includes a video decoder.

20. A non-transitory computer readable storage medium storing instructions that when executed by one or more processors cause the one or more processors to:
determine, based on direct dependent layers signaled in a video parameter set, that a current texture layer of the video data is dependent on a depth layer of the video data due to at least one block of the current texture layer being predicted using one or more blocks of the depth layer, wherein the current texture layer belongs to a first view;
determine, based on the direct dependent layers signaled in the video parameter set, that the depth layer of the video data is dependent on a second texture layer of the video data due to at least one block of the depth layer being predicted using one or more blocks of the second texture layer, wherein the second texture layer and the depth layer belong to a second view that is different than the first view;
process the current texture layer using the depth layer; and
process the depth layer using the second texture layer; and
output decoded video data comprising the current texture layer and the second texture layer.

21. The non-transitory computer readable medium of claim 20 storing further instructions that when executed cause the one or more processors to:
predict a block of the current texture layer using at least one of a depth oriented NBDV (DoNBDV) process or a backward-warping view synthesis prediction (BVSP) process using information obtained from the depth layer.

22. The non-transitory computer readable storage medium of claim 20 storing further instructions that when executed cause the one or more processors to:
separate from the direct dependent layers signaled in the video parameter set, for a slice of the texture layer, direct dependent texture layers used for forming active reference layers for the slice of the texture layer.

23. The non-transitory computer readable storage medium of claim 20 storing further instructions that when executed cause the one or more processors to:
   predict a block of the current texture layer using information obtained from the depth layer.

\* \* \* \* \*